US010742897B2

(12) United States Patent
Chan et al.

(10) Patent No.: US 10,742,897 B2
(45) Date of Patent: Aug. 11, 2020

(54) LOW-POWER AUTO-EXPOSURE CONTROL (AEC) FOR MULTI-SENSOR SYSTEMS

(71) Applicant: QUALCOMM Incorporated, San Diego, CA (US)

(72) Inventors: Victor Chan, Del Mar, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/118,232

(22) Filed: Aug. 30, 2018

(65) Prior Publication Data
US 2020/0077033 A1  Mar. 5, 2020

(51) Int. Cl.
| H04N 5/243 | (2006.01) |
| H04N 5/232 | (2006.01) |
| H04N 5/235 | (2006.01) |
| H04N 5/247 | (2006.01) |
| G06T 7/62 | (2017.01) |
| G06K 9/32 | (2006.01) |

(52) U.S. Cl.
CPC .......... H04N 5/243 (2013.01); H04N 5/2351 (2013.01); H04N 5/2353 (2013.01); H04N 5/23203 (2013.01); H04N 5/23216 (2013.01); H04N 5/23238 (2013.01); H04N 5/23264 (2013.01); H04N 5/247 (2013.01); G06K 9/3233 (2013.01); G06T 7/62 (2017.01); G06T 2207/20212 (2013.01); G06T 2207/30232 (2013.01); H04N 5/232411 (2018.08)

(58) Field of Classification Search
CPC .. H04N 5/243; H04N 5/2351; H04N 5/23264; G06T 2207/30232; G06K 9/3233
See application file for complete search history.

(56) References Cited

U.S. PATENT DOCUMENTS

| 2011/0234807 A1* | 9/2011 | Jones ............... G08B 13/19641 348/159 |
| 2013/0208140 A1* | 8/2013 | Quast ................ H04N 5/23203 348/229.1 |

* cited by examiner

Primary Examiner — Ahmed A Berhan
(74) Attorney, Agent, or Firm — Holland & Hart LLP/QUALCOMM Incorporated

(57) ABSTRACT

Methods, systems, and devices for exposure control are described, including capturing a first and second field of view with a first and second sensor. The techniques may include identifying a brightness difference and an exposure time difference between the first and second sensor, and capturing a first image and a second image, and outputting a third image including both the first and second image. Techniques may include determining an exposure bias, identifying a hypothesis total gain for the first sensor and a peer sensor total gain for the second sensor, and selecting a total gain for each sensor based on comparing the hypothesis total gain and the peer sensor total gain, and based on a maximum brightness difference between the two sensors. The total gain for each sensor may be adjusted to satisfy the maximum brightness difference and the exposure bias, or based on a region of interest.

20 Claims, 14 Drawing Sheets

LOW-POWER AUTO-EXPOSURE CONTROL (AEC) FOR MULTI-SENSOR SYSTEMS

BACKGROUND

The following relates generally to exposure control, and more specifically to low-power auto-exposure control (AEC) for multi-sensor systems. In some examples, a multi sensor system may be implemented to capture images. For example, a home automation or building security system may include one or more sensors (e.g., cameras) to capture a field of view (e.g., an outdoor area outside an entry to a building, home, or other structure, an indoor area captured by security cameras in a room, or the like). A multi-sensor system may utilize AEC to identify a single exposure for the entire field of view. However, in multi-camera or multi-vision-sensor systems, the field of view of the system can span a very wide area (e.g. 100 degrees), and a single AEC setting is unlikely to be sufficient to maintain proper light exposure across all the sensors in the system. In cases where the multi-sensor system captures a wide field of view (e.g., multiple sensors capturing smaller fields of view that make up the large field of view), traditional AEC tends to get the correct exposure in one area but at the expense of over-exposure or under-exposure in a different area. Improved image capture by multiple sensors with a wide field of view may be desirable.

SUMMARY

The described techniques relate to improved methods, systems, devices, and apparatuses that support low-power auto-exposure control (AEC) for multi-sensor systems. Generally, the described techniques provide for capturing a first field of view with a first sensor and a second field of view with a second sensor. In some examples, the techniques may include identifying a brightness difference and an exposure time difference between the first sensor and the second sensor, and capturing a first image with the first sensor, a second image with the second sensor, and outputting a third image including both the first image and the second image (where the brightness and exposure time of the first image and the second image are different). Techniques may include determining an exposure bias of HIGHLIGHTS, SHADOWS, MIDTONES, or NONE (e.g., a bias toward highlights, lowlights midtones, or no bias), identifying a hypothesis total gain (including analog gain and exposure time) for the first sensor and a peer sensor total gain for the second sensor, and selecting a total gain for each sensor based on comparing the hypothesis total gain and the peer sensor total gain, and based on a maximum brightness difference between the two sensors. The total gain of one or both of the sensors may be adjusted to satisfy the maximum brightness difference and the exposure bias. Techniques may also include identifying a region of interest and adjusting the total gain of the sensors based on the region of interest.

A method of exposure control is described. The method may include determining an exposure bias for a first sensor having a first field of view and a second sensor having a second field of view, identifying a hypothesis total gain for the first sensor based on the exposure bias, identifying a peer sensor total gain for the second sensor based on the exposure bias, selecting a total gain for the first sensor and a total gain for the second sensor based on a difference between the hypothesis total gain and the peer sensor total gain, and based on a maximum brightness difference between the first sensor and the second sensor, capturing a first image of the first field of view by the first sensor using the selected total gain for the first sensor and capturing a second image of the second field of view by the second sensor using the selected total gain for the second sensor, and outputting a third image based on the first image and the second image.

An apparatus for exposure control is described. The apparatus may include a processor, memory in electronic communication with the processor, and instructions stored in the memory. The instructions may be executable by the processor to cause the apparatus to determine an exposure bias for a first sensor having a first field of view and a second sensor having a second field of view, identify a hypothesis total gain for the first sensor based on the exposure bias, identify a peer sensor total gain for the second sensor based on the exposure bias, select a total gain for the first sensor and a total gain for the second sensor based on a difference between the hypothesis total gain and the peer sensor total gain, and based on a maximum brightness difference between the first sensor and the second sensor, capture a first image of the first field of view by the first sensor using the selected total gain for the first sensor and capturing a second image of the second field of view by the second sensor using the selected total gain for the second sensor, and output a third image based on the first image and the second image.

Another apparatus for exposure control is described. The apparatus may include means for determining an exposure bias for a first sensor having a first field of view and a second sensor having a second field of view, identifying a hypothesis total gain for the first sensor based on the exposure bias, identifying a peer sensor total gain for the second sensor based on the exposure bias, selecting a total gain for the first sensor and a total gain for the second sensor based on a difference between the hypothesis total gain and the peer sensor total gain, and based on a maximum brightness difference between the first sensor and the second sensor, capturing a first image of the first field of view by the first sensor using the selected total gain for the first sensor and capturing a second image of the second field of view by the second sensor using the selected total gain for the second sensor, and outputting a third image based on the first image and the second image.

A non-transitory computer-readable medium storing code for exposure control is described. The code may include instructions executable by a processor to determine an exposure bias for a first sensor having a first field of view and a second sensor having a second field of view, identify a hypothesis total gain for the first sensor based on the exposure bias, identify a peer sensor total gain for the second sensor based on the exposure bias, select a total gain for the first sensor and a total gain for the second sensor based on a difference between the hypothesis total gain and the peer sensor total gain, and based on a maximum brightness difference between the first sensor and the second sensor, capture a first image of the first field of view by the first sensor using the selected total gain for the first sensor and capturing a second image of the second field of view by the second sensor using the selected total gain for the second sensor, and output a third image based on the first image and the second image.

Some examples of the method, apparatuses, and non-transitory computer-readable medium described herein may further include operations, features, means, or instructions for identifying that the hypothesis total gain may be closer to the exposure bias than the peer sensor total gain, identifying a maximum difference between the total gain of the first sensor and the total gain of the second sensor based on the maximum brightness difference between the first sensor and the second sensor, determining that the maximum difference between the total gain of the first sensor and the total gain of the second sensor may be greater than the difference between the hypothesis total gain and the peer sensor total gain and where selecting the total gain for the first sensor and the total gain for the second sensor further includes setting the total gain for the first sensor equal to the hypothesis total gain, and setting the total gain for the second sensor equal to the peer sensor total gain based on the determining.

Some examples of the method, apparatuses, and non-transitory computer-readable medium described herein may further include operations, features, means, or instructions for identifying that the hypothesis total gain may be closer to the exposure bias than the peer sensor total gain, identifying a maximum difference between the total gain of the first sensor and the total gain of the second sensor based on the maximum brightness difference between the first sensor and the second sensor, determining that the maximum difference between the total gain of the first sensor and the total gain of the second sensor may be less than the difference between the hypothesis total gain and the peer sensor total gain and where selecting the total gain for the first sensor and the total gain for the second sensor further includes setting the total gain for the first sensor equal to the hypothesis total gain, and setting the total gain for the second sensor such that the difference between the total gain for the first sensor and the total gain for the second sensor may be equal to the maximum difference between the total gain of the first sensor and the total gain of the second sensor.

Some examples of the method, apparatuses, and non-transitory computer-readable medium described herein may further include operations, features, means, or instructions for identifying that the peer sensor total gain may be closer to the exposure bias than the hypothesis total gain, identifying a maximum difference between the total gain of the first sensor and the total gain of the second sensor based on the maximum brightness difference between the first sensor and the second sensor, determining that the maximum difference between the total gain of the first sensor and the total gain of the second sensor may be greater than the difference between the hypothesis total gain and the peer sensor total gain and where selecting the total gain for the first sensor and the total gain for the second sensor further includes setting the total gain for the first sensor equal to the hypothesis total gain, and setting the total gain for the second sensor equal to the peer sensor total gain based on the determining.

Some examples of the method, apparatuses, and non-transitory computer-readable medium described herein may further include operations, features, means, or instructions for identifying that the peer sensor total gain may be closer to the exposure bias than the hypothesis total gain, identifying a maximum difference between the total gain of the first sensor and the total gain of the second sensor based on the maximum brightness difference between the first sensor and the second sensor, determining that the maximum difference between the total gain of the first sensor and the total gain of the second sensor may be less than the difference between the hypothesis total gain and the peer sensor total gain and where selecting the total gain for the first sensor and the total gain for the second sensor further includes setting the total gain for the first sensor such that the difference between the total gain for the first sensor and the total gain for the second sensor may be equal to the maximum difference between the total gain of the first sensor and the total gain of the second sensor, and setting the total gain for the second sensor equal to the peer sensor total gain.

In some examples of the method, apparatuses, and non-transitory computer-readable medium described herein, determining the exposure bias further may include operations, features, means, or instructions for receiving a user input identifying the exposure bias, or automatically selecting an exposure bias based on one or more conditions.

In some examples of the method, apparatuses, and non-transitory computer-readable medium described herein, the exposure bias includes a bias toward a highlights of a dynamic range, a bias toward shadows of the dynamic range, a bias toward midtones of the dynamic range, or no bias.

Some examples of the method, apparatuses, and non-transitory computer-readable medium described herein may further include operations, features, means, or instructions for sending, from the first sensor to the second sensor, the hypothesis total gain, receiving, from the second sensor at the first sensor, the peer sensor total gain, where identifying the peer sensor total gain for the second sensor may be based on receiving and where selecting a total gain for the first sensor and a total gain for the second sensor may be based on the sending and the receiving.

In some examples of the method, apparatuses, and non-transitory computer-readable medium described herein, a total gain value may be based on analog gain, digital gain, exposure time, or a combination thereof.

A method of exposure control is described. The method may include identifying a region of interest, where at least a first portion of the region of interest is located in a first field of view associated with a first sensor, determining a target total gain for the first sensor based on the region of interest, and determining a peer target total gain for a second sensor, selecting a total gain for the first sensor and a total gain for the second sensor based on a comparison between the target total gain and the peer target total gain, capturing a first image of the first field of view by the first sensor using the selected total gain for the first sensor and capturing a second image of a second field of view by the second sensor using the selected total gain for the second sensor, and outputting an image based on the captured first image and the captured second image.

An apparatus for exposure control is described. The apparatus may include a processor, memory in electronic communication with the processor, and instructions stored in the memory. The instructions may be executable by the processor to cause the apparatus to identify a region of interest, where at least a first portion of the region of interest is located in a first field of view associated with a first sensor, determine a target total gain for the first sensor based on the region of interest, and determining a peer target total gain for a second sensor, select a total gain for the first sensor and a total gain for the second sensor based on a comparison between the target total gain and the peer target total gain, capture a first image of the first field of view by the first sensor using the selected total gain for the first sensor and capturing a second image of a second field of view by the second sensor using the selected total gain for the second sensor, and output an image based on the captured first image and the captured second image.

Another apparatus for exposure control is described. The apparatus may include means for identifying a region of interest, where at least a first portion of the region of interest is located in a first field of view associated with a first sensor, determining a target total gain for the first sensor based on the region of interest, and determining a peer target total gain for a second sensor, selecting a total gain for the first sensor and a total gain for the second sensor based on a comparison between the target total gain and the peer target total gain, capturing a first image of the first field of view by the first sensor using the selected total gain for the first sensor and capturing a second image of a second field of view by the second sensor using the selected total gain for the second sensor, and outputting an image based on the captured first image and the captured second image.

A non-transitory computer-readable medium storing code for exposure control is described. The code may include instructions executable by a processor to identify a region of interest, where at least a first portion of the region of interest is located in a first field of view associated with a first sensor, determine a target total gain for the first sensor based on the region of interest, and determining a peer target total gain for a second sensor, select a total gain for the first sensor and a total gain for the second sensor based on a comparison between the target total gain and the peer target total gain, capture a first image of the first field of view by the first sensor using the selected total gain for the first sensor and capturing a second image of a second field of view by the second sensor using the selected total gain for the second sensor, and output an image based on the captured first image and the captured second image.

In some examples of the method, apparatuses, and non-transitory computer-readable medium described herein, at least a second portion of the region of interest may be located in the second field of view; and where identifying the region of interest further includes, determining a relative size of the first portion of the region of interest that may be located in the first field of view and determining a relative size of the second portion of the region of interest that may be located in the second field of view and selecting the target total gain for the first sensor and the peer target total gain for the second sensor based on a determined relative sizes.

Some examples of the method, apparatuses, and non-transitory computer-readable medium described herein may further include operations, features, means, or instructions for identifying a maximum brightness difference between the first sensor and the second sensor and selecting the total gain for the first sensor and the total gain for the second sensor based on the maximum brightness difference.

Some examples of the method, apparatuses, and non-transitory computer-readable medium described herein may further include operations, features, means, or instructions for identifying an exposure bias for the first sensor and an exposure bias for the second sensor and selecting the total gain for the first sensor and the total gain for the second sensor based on the identified exposure bias for the first sensor and the identified exposure bias for the second sensor.

Some examples of the method, apparatuses, and non-transitory computer-readable medium described herein may further include operations, features, means, or instructions for sending, from the first sensor to the second sensor, the target total gain, receiving, from the second sensor at the first sensor, the peer target total gain, where determining a peer target total gain for a second sensor may be based on the receiving and where selecting a total gain for the first sensor and a total gain for the second sensor may be based on the sending and the receiving.

A method of exposure control is described. The method may include identifying a brightness difference between a first sensor having a first field of view and a second sensor having a second field of view, determining an exposure time difference between the first sensor and the second sensor based on the brightness difference, capturing, by the first sensor, a first image of the first field of view using a first exposure time, the first exposure time based on the identified brightness difference and the exposure time difference, capturing, by the second sensor, a second image of the second field of view using a second exposure time, the second exposure time based on the identified brightness difference and the exposure time difference, and outputting a third image based on the first image and the second image.

An apparatus for exposure control is described. The apparatus may include a processor, memory in electronic communication with the processor, and instructions stored in the memory. The instructions may be executable by the processor to cause the apparatus to identify a brightness difference between a first sensor having a first field of view and a second sensor having a second field of view, determine an exposure time difference between the first sensor and the second sensor based on the brightness difference, capture, by the first sensor, a first image of the first field of view using a first exposure time, the first exposure time based on the identified brightness difference and the exposure time difference, capture, by the second sensor, a second image of the second field of view using a second exposure time, the second exposure time based on the identified brightness difference and the exposure time difference, and output a third image based on the first image and the second image.

Another apparatus for exposure control is described. The apparatus may include means for identifying a brightness difference between a first sensor having a first field of view and a second sensor having a second field of view, determining an exposure time difference between the first sensor and the second sensor based on the brightness difference, capturing, by the first sensor, a first image of the first field of view using a first exposure time, the first exposure time based on the identified brightness difference and the exposure time difference, capturing, by the second sensor, a second image of the second field of view using a second exposure time, the second exposure time based on the identified brightness difference and the exposure time difference, and outputting a third image based on the first image and the second image.

A non-transitory computer-readable medium storing code for exposure control is described. The code may include instructions executable by a processor to identify a brightness difference between a first sensor having a first field of view and a second sensor having a second field of view, determine an exposure time difference between the first sensor and the second sensor based on the brightness difference, capture, by the first sensor, a first image of the first field of view using a first exposure time, the first exposure time based on the identified brightness difference and the exposure time difference, capture, by the second sensor, a second image of the second field of view using a second exposure time, the second exposure time based on the identified brightness difference and the exposure time difference, and output a third image based on the first image and the second image.

Some examples of the method, apparatuses, and non-transitory computer-readable medium described herein may further include operations, features, means, or instructions for identifying an exposure coherence between the first sensor and the second sensor, determining a maximum brightness difference between the first sensor and the second sensor based on the determined exposure coherence and where determining an exposure time difference between the first sensor and the second sensor may be based on the determined maximum brightness difference.

Some examples of the method, apparatuses, and non-transitory computer-readable medium described herein may further include operations, features, means, or instructions for identifying a motion blur coherence between the first sensor and the second sensor, determining a maximum exposure time difference between the first sensor and the second sensor based on the determined motion blur coherence and where determining an exposure time difference between the first sensor and the second sensor may be based on the maximum exposure time difference.

Some examples of the method, apparatuses, and non-transitory computer-readable medium described herein may further include operations, features, means, or instructions for determining whether a dynamic range of a scene covered by the first field of view and the second field of view exceeds the dynamic range of the first sensor and the second sensor, where identifying the brightness difference between the first sensor and the second sensor and the exposure time difference between the first sensor and the second sensor may be based on the determining.

In some examples of the method, apparatuses, and non-transitory computer-readable medium described herein, the third image includes an entirety of the first image and the second image.

Some examples of the method, apparatuses, and non-transitory computer-readable medium described herein may further include operations, features, means, or instructions for sending, from the first sensor to the second sensor, a current brightness value of the first field of view and a first proposed exposure time, receiving, from the second sensor at the first sensor, a current brightness value of the second field of view and a second proposed exposure time, where identifying the brightness difference between the first sensor and the second sensor may be based on the current brightness value of the first field of view and the current brightness value of the second field of view and where identifying the exposure time difference between the first sensor and the second sensor may be based on the first proposed exposure time and the second proposed exposure time.

DETAILED DESCRIPTION

Figure 1:
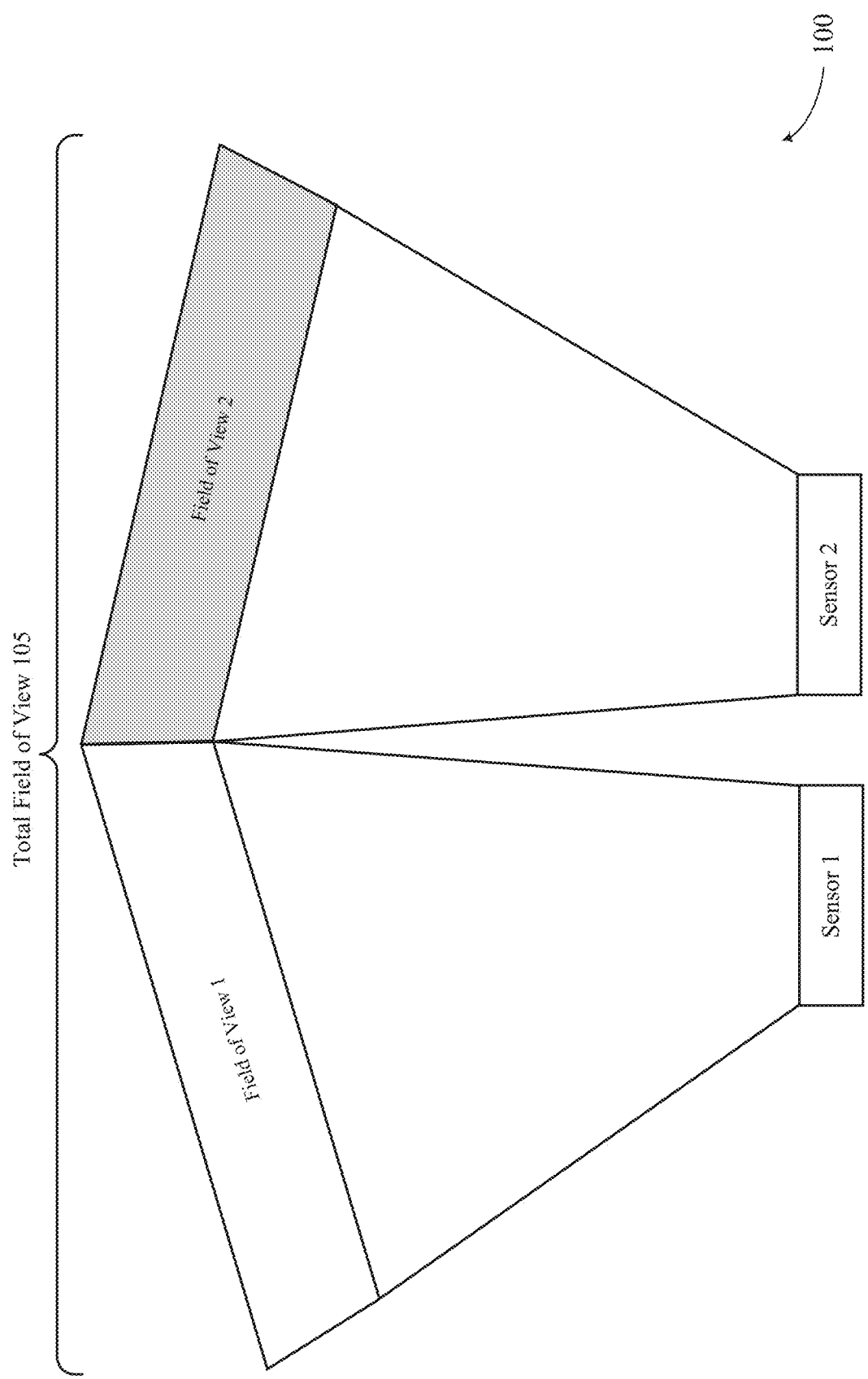
FIG. 1 illustrates an example of a multi-sensor system for exposure control that supports low-power auto-exposure control (AEC) for multi-sensor systems in accordance with aspects of the present disclosure.

A multi sensor system may capture one or more images encompassing a wide field of view. For example, a home automation or building security system may include one or more sensors (e.g., cameras) to capture a field of view (e.g., an outdoor area outside an entry to a building, home, or other structure, an indoor area captured by security cameras in a room, or the like). A multi-sensor system may utilize auto-exposure control (AEC) to identify a single exposure for the entire field of view. However, in multi-camera or multi-vision-sensor systems, the field of view of the system can span a very wide area (e.g. 100 degrees), and a single AEC setting is unlikely to be sufficient to maintain proper light exposure across all the sensors in the system. In cases where the multi-sensor system captures a wide field of view (e.g., multiple sensors capturing smaller field of view that make up the large field of view), traditional AEC tends to get the correct exposure in one area at the expense of over-exposure or under-exposure in a different area. Improved image capture by multiple sensors with a wide field of view may be desirable.

In some examples, a modified or improved AEC procedure may capture an image with multiple sensors to improve exposure across a wide field of view. In some examples, each sensor in a multi-sensor system may be initially free to determine an optimal exposure, and each sensor may capture an image at a determined optimal exposure. In some examples, each sensor may be bounded by a maximum luminance (e.g., brightness) difference, or a maximum exposure length difference, or both, so that a degree of brightness consistency and motion blur consistency between the sensors are maintained. In some cases, a user may select or a system may determine an exposure preference (e.g., an exposure bias) for all sensors capturing the scene. In such examples, one sensor may serve as an anchor if the system determines that an optimal exposure time for that sensor is closer to the exposure bias, and the other sensor may adjust its optimal exposure to fall within the maximum brightness differences or maximum exposure length difference. In some examples a user may select or a system may determine a region of interest. Exposure setting computations may be based mostly or solely on the region of interest. In some examples, the region of interest may span more than one sensor. In some examples, exposure setting may be based on both an region of interest and an exposure bias. Two or more sensors may coordinate to ensure that a specified spatial preference is accomplished while increasing power efficiency. An AEC algorithm may enter a sleep mode in which frames are skipped without AEC computation thus reducing energy expenditure. Similarly, a high gain value can also be used by the algorithm to strategically limit the exposure time used.

Aspects of the disclosure are initially described in the context of a multi-sensor system. Aspects of the disclosure are further illustrated by and described with reference to process flows, flow diagrams, and multi-sensor systems. Aspects of the disclosure are further illustrated by and described with reference to apparatus diagrams, system diagrams, and flowcharts that relate to low-power AEC for multi-sensor systems.

FIG. 1 illustrates an example of a multi-sensor system that supports low-power AEC for multi-sensor systems in accordance with aspects of the present disclosure. In some examples, a home automation or building security system may include one or more sensors (e.g., cameras) to capture a field of view (e.g., an outdoor area outside an entry to a building, home, or other structure, an indoor area captured by security cameras in a room, or the like). A multi-sensor system may utilize AEC to identify a single exposure for the entire field of view.

In some examples of a multi-sensor system, multiple sensors (e.g., sensor 1, sensor 2, and the like) may be configured to capture a total field of view 105. Sensors in a multi-sensor system may be, for example, cameras capable of capturing one or more images. sensor 1 may capture field of view 1, and sensor 2 may capture field of view 2.

In some examples of a multi-sensor system, the dynamic range of total field of view 105 may be greater than the capacity of a capturing sensor. In some cases, multiple sensors such as sensor 1 and sensor 2 may be configured to capture a wield field of view, such as total field of view 105. Total field of view 105 may include mixed lighting conditions with drastically different brightness levels. In one illustrative example, total field of view 105 may capture a visual scene. Sensor 1 may include a lens capable of capturing, for instance, a 72 degree field of view. Sensor 2 may similarly include a lens capable of capturing a 72 degree field of view. In such cases, total field of view 105 may encompass a 144 degree field of view. In some examples, field of view 1 may include a large amount of light, and thus a high brightness value. Field of view 2 may include a small amount of light, and thus a low brightness value. For instance, if total field of view 105 encompasses a visual scene of a covered front porch, field of view 1 may encompass an open area close to an entry with a lot of sunlight, and field of view 2 may encompass the corner of the covered porch with a lot of shadow and very little light.

If a multi-sensor system enables AEC to select a single exposure time to capture the total field of view 105 (e.g., sensor 1 captures field of view 1 with an exposure time, and sensor 2 captures field of view 2 with the same exposure time), then the system may capture a portion of the total field of view 105 at an acceptable exposure time, and a portion of the total field of view 105 at a non-acceptable exposure time. That is, an exposure time for field of view 1 may be selected to generate an image that is clear and pleasing to a viewer. However, the same exposure time when applied in capturing field of view 2 may result in an image that is too dark to be pleasing or useful to a user. Similarly, an exposure time for field of view 2 that generates an image that is clear and pleasing to the viewer may generate an image that is too bright or totally white when applied to sensor 1. Instead, a multi-sensor system may identify a different exposure time at each sensor, and may adjust one or more of the exposure times based on bounds in brightness, exposure time, or the like.

Figure 2A:
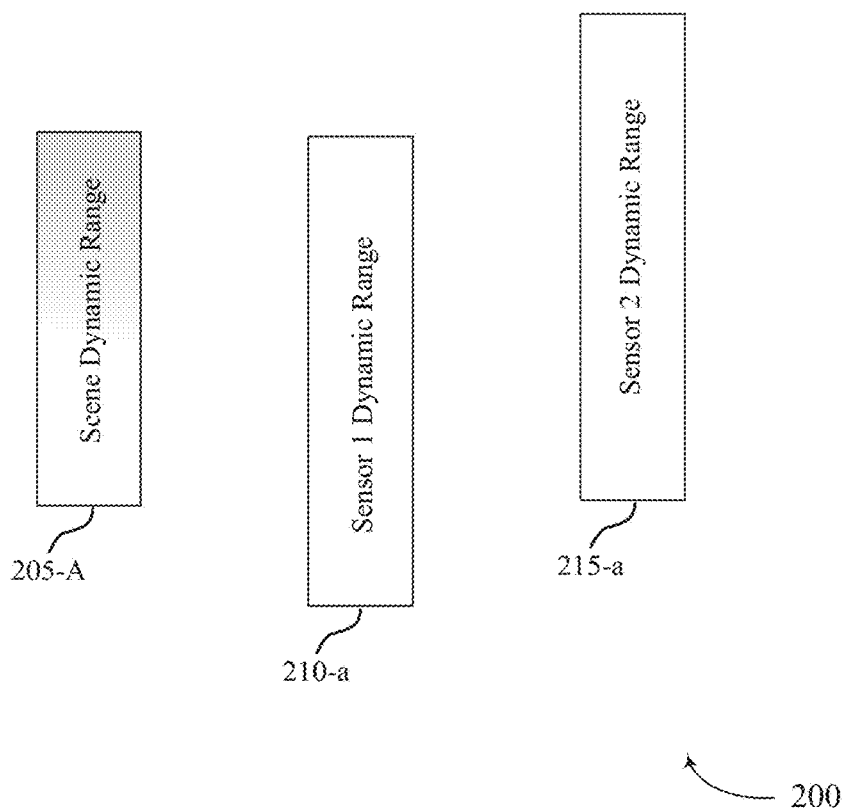
FIG. 2A illustrates an example of a multi-sensor system that supports low-power AEC for multi-sensor systems in accordance with aspects of the present disclosure.

FIG. 2A illustrates an example of a multi-sensor system 200 that supports low-power AEC for multi-sensor systems in accordance with aspects of the present disclosure.

As described with respect to FIG. 1, a visual scene may cover a scene dynamic range 205-a (e.g., a range of bright and dark portions of a total scene which may be expressed as a ratio between the highest exposure value and the lowest exposure value). The visual scene may cover a physical area with extreme differences in lighting. For instance, an outdoor scene in direct sunlight may have an exposure value of 16. An outdoor scene in shadow may have an exposure value of 12. An indoor scene may have an exposure value of 6. In some cases, scene dynamic range 205-a may cover part or all of a dynamic range of one or more sensors capturing part or all of the scene. For instance, a visual scene may span disparate light conditions, and thus have a large scene dynamic range 205-a. Or, a scene may span similar light conditions and thus may have a small scene dynamic range 205-a.

Figure 2B:
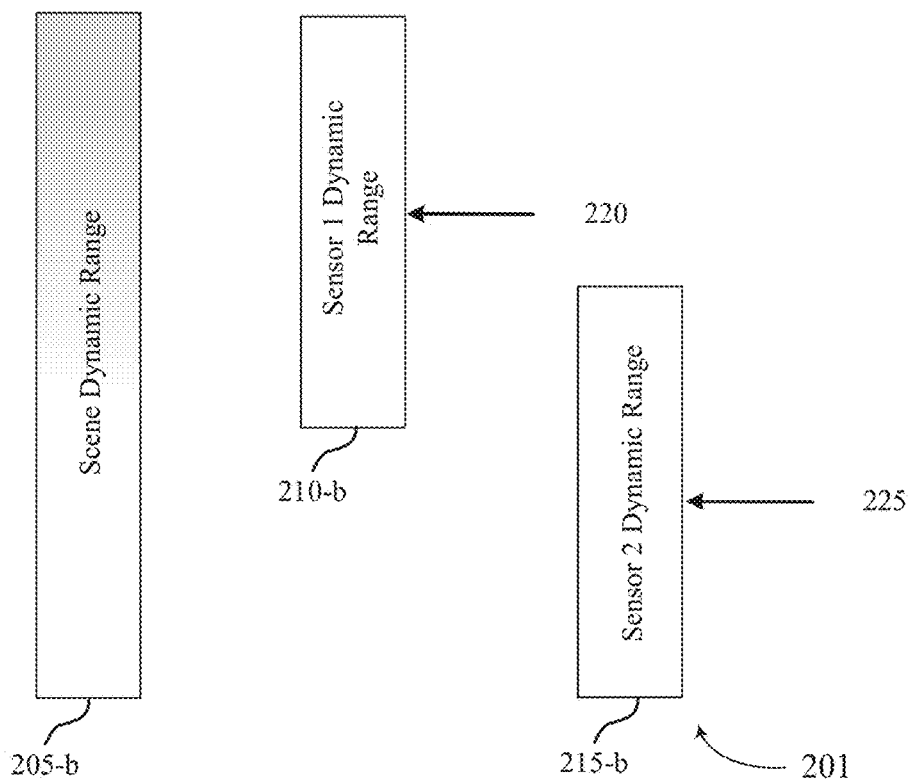
FIG. 2B illustrates an example of a multi-sensor system that supports low-power AEC for multi-sensor systems in accordance with aspects of the present disclosure.

In some examples, a set of sensors (e.g., first sensor and a second sensor) may capture part or all of a visual scene. For example, 8-bit sensor may include a dynamic range of 8 exposure values (e.g., 1-8 EV, 5-12 EV, etc.). In some examples, the dynamic range of the sensors may be different from the scene dynamic range 205-a. For instance, sensor 1 dynamic range 210-a may be greater than scene dynamic range 205-a. In some examples, the entire dynamic range of scene dynamic range 205-a may fall within sensor 1 dynamic range 210-a. In some examples, sensor 2 dynamic range 215-a may be greater than scene dynamic range 205-a. In such examples, the entire dynamic range of scene dynamic range 205-a may fall within sensor 2 dynamic range 215-a. In such cases, where a scene dynamic range 205-a falls within both sensor 1 dynamic range 210-a and sensor 2 dynamic range 215-a, an exposure time or a total gain (which may include both analog gain and exposure time) may be selected to capture the dynamic range at sensor 1 and sensor 2. Because the entire scene dynamic range 205-a falls within sensor 1 dynamic range 210-a and sensor 2 dynamic range 215-a, any selected exposure time or total gain may be appropriate, and may be utilized for both sensor 1 and sensor 2. However, in some examples, the scene dynamic range 205-b may be greater than the dynamic range of either sensor, as described in greater detail with respect to FIG. 2B.

Figure 3:
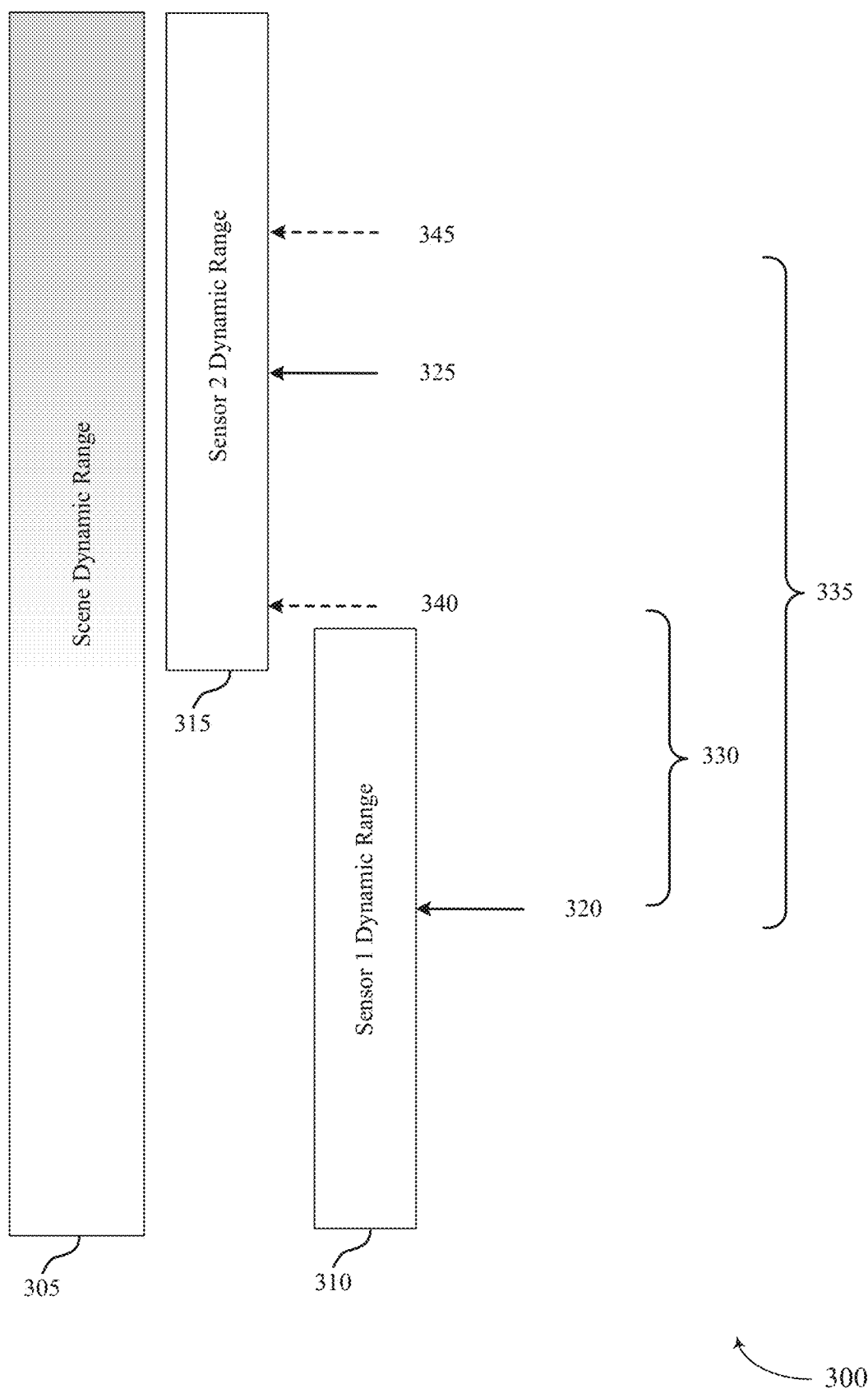
FIG. 3 illustrates an example of a multi-sensor that supports low-power AEC for multi-sensor systems in accordance with aspects of the present disclosure.

FIG. 3B illustrates an example of a multi-sensor system 201 that supports low-power AEC for multi-sensor systems in accordance with aspects of the present disclosure. In some examples, a scene may cover a dynamic range 205-b (e.g., a range of brightness values in a particular scene). The visual scene may cover a physical area with extreme differences in lighting. In some cases, scene dynamic range 205-b may cover part or all of a dynamic range of one or more sensors capturing part or all of the scene.

In some examples, scene dynamic range 205-b may have a greater dynamic range than the dynamic range of either sensor. That is, scene dynamic range 205-b may span disparate light conditions (e.g., shadows and highlights). Scene dynamic range 205-b may cover mixed indoor and outdoor conditions with drastically different brightness levels. For example, sensor 1 dynamic range 210-b may cover lower exposure values that correspond to the lower exposure values of scene dynamic range 205-b. Sensor 2 dynamic range 215-b may cover higher exposure values that correspond to the higher portion of scene dynamic range 205-b. In such examples, an ideal exposure time or total gain for one sensor may not fall within the dynamic range of the other sensor. For instance, a single exposure setting may not cover scene dynamic range 205-b, which may result in under-exposure in shadowed areas of a scene, or overexposure in highlight areas of the scene. For instance, an ideal exposure time 220 for capturing an image at sensor 1 may not fall within sensor 1 dynamic range 210-b. Similarly, ideal exposure time 225 for capturing an image at sensor 2 may not fall within sensor 2 dynamic range 215-b.

In some examples, a multi-sensor system may permit each sensor to determine an ideal exposure time. independent exposure times for each sensor may expand aggregate sensor dynamic range to match a full scene dynamic range 205-b. By using a different exposure time in each sensor, more visual information may be captured. Sensor 1 may select ideal exposure time 220 and sensor 2 may select ideal exposure time 225. In some examples, selecting ideal exposure times 220 and 225 may be bounded by a maximum brightness difference or a maximum exposure time difference, or both. Thus, the sensors in multi-sensor system may identify a maximum brightness difference or a maximum exposure time difference, and may select the individual ideal exposure times 220 and 225 to satisfy one or both of the maximum brightness difference and the maximum exposure time difference. The first sensor may capture a first image at ideal exposure time 220, and the second sensor may capture the second image at ideal exposure time 225. The multi-sensor system may then output a third image that includes some or all of the first image and the second image. In some cases, a portion of the first image and a portion of the second image may be combined to create the third image. In some cases, the entire first image may be merged with the entire second image to create the third image. By combining a first image, captured at an ideal exposure time 220 by a first sensor having sensor 1 dynamic range 210-b and a second image, captured at an ideal exposure time 225 by a second sensor having sensor 2 dynamic range 215-b, a third image that can cover scene dynamic range 205-b may be generated, and most or all of the scene (including relatively bright or relatively dark portions of a scene with a large dynamic range) may be captured in a generated third image.

In some examples, peer sensors may communicate, and may capture or produce a more aesthetically pleasing image. For instance, a peer sensor may transmit or receive (e.g., from another peer sensor, from a communications manager or from a user input) a maximum brightness difference between sensors. In some examples, a sensor may receive or determine an exposure coherence (a maximum exposure value difference).

Figure 4:
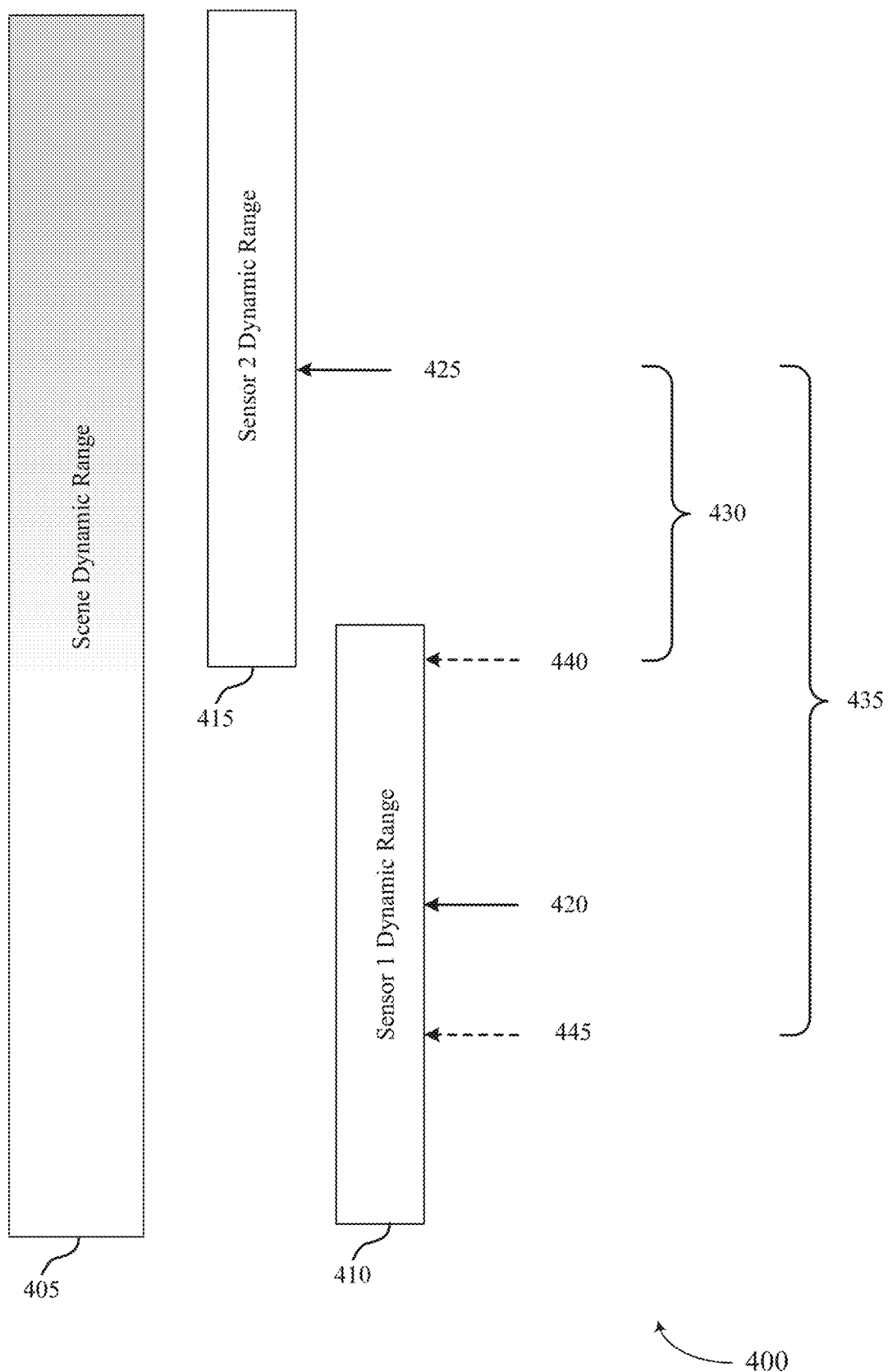
FIG. 4 illustrates an example of a multi-sensor system that supports low-power AEC for multi-sensor systems in accordance with aspects of the present disclosure.

FIG. 4 illustrates an example of a multi-sensor system 400 that supports low-power AEC for multi-sensor systems in accordance with aspects of the present disclosure. In some examples, a multi-sensor system 400 may implement aspects of a multi-sensor system 100, 200, or 201.

In some examples, a multiple sensors may cover a scene with a wide field of view having a scene dynamic range 305. A first sensor of the system may have a sensor 1 dynamic range 310, and a second sensor may have a sensor 2 dynamic range 315. In some examples, an ideal exposure time for a first sensor may not fall within the dynamic range of another sensor.

In some examples, the multi-sensor system may apply an exposure bias. An exposure bias may be a bias toward highlights, a bias toward lowlights, a bias toward midtones, or include no bias. The exposure bias may be input by a user. For instance, a user may be interested in a shadowy portion of a captured scene (e.g., a shadowy area of an indoor scene) and may input a bias toward lowlights. In some examples, an exposure bias may be dynamically determined by the system based on conditions. In an illustrative example, a multi-sensor system may select an exposure bias toward highlights during the day (e.g., a shorter exposure time), and an exposure bias toward lowlights during the night (e.g., a longer exposure time).

In some examples, a multi-sensor system may select a total gain for each sensor based at least in part on an exposure bias. Total gain may include analog gain and an exposure time. A first sensor may select hypothesis total gain, and may identify a peer sensor total gain. In some examples, the sensors may be in communication. The first sensor may send its hypothesis total gain to the second sensor, and may receive a peer sensor total gain from the second sensor. The hypothesis total gain or the peer sensor total gain may be closer to the exposure bias, and the total gain for the other sensor may be adjusted to satisfy a minimum brightness difference. If the difference between the hypothesis total gain and the peer sensor total gain is less than the maximum brightness difference, then the first sensor may capture an image using the hypothesis total gain, and the second sensor may capture an image using the peer sensor total gain. However, if the difference between the hypothesis total gain and the peer sensor total gain is greater than the maximum brightness difference, then the total gain that is further from the exposure bias may be adjusted to satisfy the maximum brightness difference.

In an illustrative example, the exposure bias may be a highlights exposure bias. A first sensor may identify a hypothesis total gain 320 independently from total gain for any other sensors. In some examples, the first sensor may send the hypothesis total gain to a second sensor. The second sensor may identify peer sensor total gain 325, and may send peer sensor total gain 325 to the first sensor. Because sensor 1 dynamic range 310 encompasses more highlights than sensor 2 dynamic range 315 (i.e., sensor 1 dynamic range 310 is closer to the exposure bias), hypothesis total gain 320 may act as an anchor, and the second sensor may adjust its total gain to satisfy a maximum brightness difference.

In some examples, the multi-sensor system may identify a maximum brightness difference. The maximum brightness difference may be input by a user or determined by the multi-user system to achieve an aesthetically pleasing image. Multiple sensors in the multi-sensor system may adjust total gain for each sensor to satisfy the maximum brightness difference. In some examples, the maximum brightness difference 330 may be less than the difference between hypothesis total gain 320 and per sensor total gain 325. Because hypothesis total gain 320 may be the anchor total gain (e.g., based on a highlights exposure bias) the second sensor may adjust peer sensor total gain 325 and may instead select total gain 340, which falls within the maximum brightness difference 330. The first sensor may capture a first image at total gain 320, and the second sensor may capture a second image at total gain 340. The system may combine the two capture images to generate and output a third image including part or all of the first image and the second image. In some examples, a maximum brightness difference 335 may be greater than the difference between hypothesis total gain 320 and peer sensor total gain 325. In such cases, upon determining that the peer sensor total gain 325 falls within maximum brightness difference 335, the first sensor and the second sensor may determine not to adjust either the hypothesis total gain or the peer sensor total gain. That is, the first sensor may capture a first image at total gain 320, and the second sensor may capture a second image at total gain 325. A third image may be output based on the first image and the second image.

In some examples, determining to adjust one of the total gain values may be calculated as follows:

$$T_{current} = \begin{cases} T_{proposed}, & T_{proposed} \leq T_{peer} \\ \min(T_{proposed}, T_{peer} * (2^{\Delta})), & T_{proposed} > T_{peer} \end{cases},$$

where $T_{current}$ defines a currently selected or calculated total gain value, $T_{proposed}$ represents a hypothesis total gain, $T_{peer}$ represents a peer sensor total gain, and $\Delta$ represents the maximum brightness difference in exposure values (e.g., 1 EV, 2, EV, 3 EV, etc.). In some cases, a peer sensor (e.g., the second sensor) may be closer to the exposure bias, as described in greater detail with respect to FIG. 4.

Figure 5:
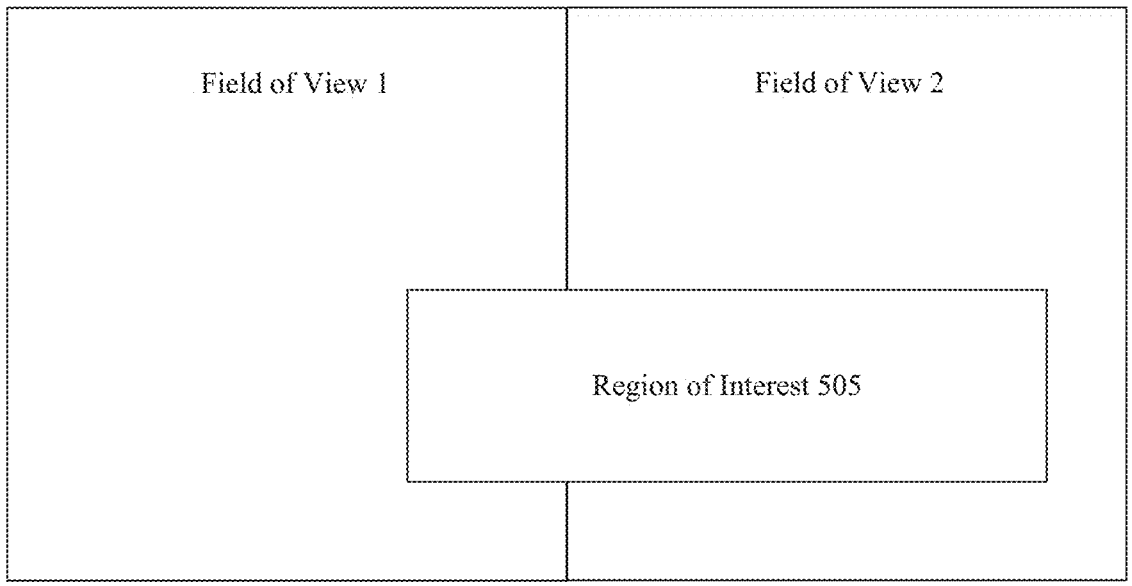
FIG. 5 illustrates an example of a multi-sensor system that supports low-power AEC for multi-sensor systems in accordance with aspects of the present disclosure.

FIG. 5 illustrates an example of a multi-sensor system 500 that supports low-power AEC for multi-sensor systems in accordance with aspects of the present disclosure. In some examples, multi-sensor system 500 may implement aspects of multi-sensor systems 100, 200, 201, and 300.

In some examples, a wide field of view may cover scene dynamic range 405. A first sensor may cover sensor 1 dynamic range 410, and a second sensor may cover sensor 2 dynamic range 415.

In some cases, the multi-sensor system may apply an exposure bias. An exposure bias may be a bias toward highlights, a bias toward lowlights, a bias toward midtones, or include no bias. The exposure bias may be input by a user, or may be dynamically determined by the system based on one or more conditions. In an illustrative example, a multi-sensor system may select an exposure bias toward lowlights (e.g., shadows requiring a longer exposure time). during the day (e.g., a shorter exposure time), and an exposure bias toward lowlights during the night (e.g., a longer exposure time).

In an illustrative example, the exposure bias may be a lowlights exposure bias (e.g., requiring a longer exposure time for a clear image). In some examples, the sensor 2 dynamic range 415 may be closer to the exposure bias than sensor 1 dynamic range 410. In such cases, a peer sensor (e.g., the second sensor) may act as an anchor sensor, and the first sensor may adjust a total gain value to capture an image with a total gain that satisfies a maximum brightness difference. In some examples, the first sensor may send hypothesis total gain 420 to the second sensor, and may receive from the second sensor a peer sensor total gain 425. The hypothesis total gain 420 and the peer sensor total gain 425 may be independently determined. In some examples, the system may determine or may receive via user input a maximum brightness difference 430. In such examples, the first sensor (or a sensor manager of the multi-sensor system) may determine that the difference between hypothesis total gain 420 and peer sensor total gain 425 exceeds maximum brightness difference 430. In such examples, because the second sensor is the anchor sensor, the first sensor may adjust the total gain to total gain 440, which falls within maximum brightness difference 430. The first sensor may capture a first image at total gain 440, and the second sensor may capture a second image at total gain 425.

In some examples, the first sensor may determine that the maximum brightness difference is greater than the difference between hypothesis total gain 420 and peer sensor total gain 425. In such cases, the first sensor may refrain from adjusting total gain, and may capture a first image at total gain 420 while the second sensor captures a second image at total gain 425. In some cases, other considerations (e.g., a region of interest, as described in greater detail with respect to FIG. 5) may be utilized to determine a total gain. For instance, the first sensor may consider the anchor sensor (e.g., the second sensor) in adjusting a hypothesis total gain 420, and may consider adjusting the total gain 420 toward lowlight exposure values. However, other considerations such as a region of interest may indicate that highlight exposure values may be used instead. In such cases, the sensor may select total gain 445 because such a total gain value may be closer to highlight exposure values while still satisfying maximum brightness difference 435.

In some examples, one or more sensors or a sensor manager of the multi-sensor system may determine total gain values as follows:

$$T_{current} = \begin{cases} T_{proposed}, & T_{proposed} \geq T_{peer} \\ \max(T_{proposed}, T_{peer}/(2^{\Delta})), & T_{proposed} < T_{peer} \end{cases}$$

In some examples, an exposure bias may be toward midtones. In such cases, the maximum brightness difference may be adjusted (e.g., may be smaller) in order to minimize adjustments and maintain total gain values that are closer to midtone values. In such examples, one or more sensors or a sensor manager of the multi-sensor system may determine total gain values as follows:

$$T_{current} = \begin{cases} \max(T_{proposed}, T_{avg} * (2^{-\Delta/2})), & T_{proposed} \leq T_{peer} \\ \min(T_{proposed}, T_{avg} * (2^{\Delta/2})), & T_{proposed} > T_{peer} \end{cases}$$

For instance, if a maximum brightness difference is 3 EV, then for a midtone exposure bias, the maximum brightness difference may be considered to be 1.5 EV. In some examples, a total gain for each sensor may be determined based on a region of interest.

In the examples described with respect to FIG. 4, an increase or decrease in a brightness difference between each sensor capturing a visual scene may result in an observable master-slave relationship, in which the sensor that is closest to the exposure bias serves as an anchor sensor, and the total gain of one or more peer sensors adjusts to meet the maximum brightness difference with respect to the anchor sensor. In some cases, if the visual scene switches the brightness difference (e.g., the sensor that was capturing a brighter portion of a scene is forced to capture a darker portion of a scene) then the master-slave relationship may switch and the other sensor may become the anchor sensors.

Figure 6:
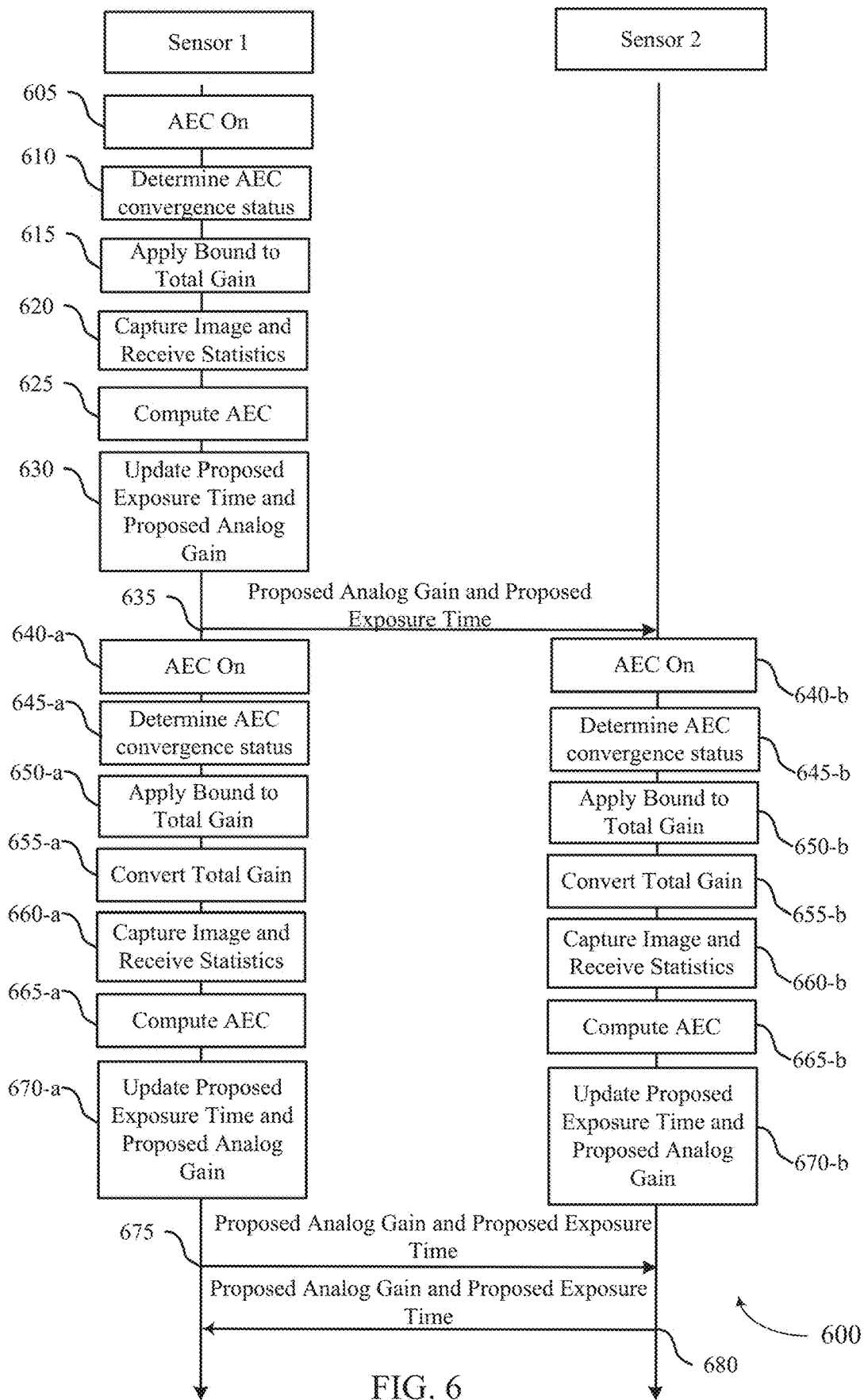
FIG. 6 illustrates an example of a multi-sensor system that supports low-power AEC for multi-sensor systems in accordance with aspects of the present disclosure.

FIG. 6 illustrates an example of a multi-sensor system 600 that supports low-power AEC for multi-sensor systems in accordance with aspects of the present disclosure. In some examples, multi-sensor system 600 may implement aspects of multi-sensor systems 100, 200, 201, 300, and 400.

In some examples a multi-sensor system may identify a region of interest, and may determine total gain for each sensor based thereon. For instance, the sensors of the system may cover a wide field of view. A first sensor may cover field of view 1, and a second sensor may cover field of view 2. In some examples, a region of interest 505 may be identified. In some examples, the region of interest may be identified by a user input. In an illustrative example, field of view 1 and field of view 2 may cover a front porch. A user may determine that, for example, an area where packages are regularly left is a region of interest. In another illustrative example, a structure may have a security system including multiple sensors, and administrators may determine that a particular area included in field of view 1 and field of view 2 is prone to criminal activity. In these and other examples, a user may identify the region of interest 505 and may input the region to the multi-sensor system. In some examples, the system may dynamically determine the region of interest 505 (e.g., one or more sensors may identify an area where more movement occurs).

Sensors in the multi sensor system may coordinate and adjust total gain based on the region of interest. For instance, if the region of interest 505 is located entirely in field of view 2 (not shown), then the second sensor may determine an ideal total gain based on field of view 2. The first sensor may then adjust its ideal total gain to satisfy any requirements (e.g., a maximum brightness difference or a maximum exposure time difference). However, if the region of interest 505 is located in both field of view 1 and field of view 2, then both sensors may adjust their ideal total gain for capturing the first field of view and the second field of view.

In some examples, two sensors that each capture a portion of a region of interest 505 may adjust their ideal total gain based on the proportion of the region of interest located in the corresponding field of view. In an illustrative example, 20% of region of interest 505 may be located in field of view 1 and 80% of region of interest 505 may be located in field of view 2. A maximum brightness difference may be 5 EV. The first sensor may determine, independently, that the ideal total gain at the first sensor is 6 EV (e.g., an ideal total gain for an indoor image). The second sensor may determine independently that the ideal total gain at the second sensor is 16 EV (e.g., for an outdoor image with a lot of sunlight). Thus, the current brightness difference is 10 EV (and may be decreased by 5 EV to satisfy the maximum brightness difference). Both the first sensor and the second sensor may adjust the total gain for each sensor, but may do so proportionally based on the percentage of the region of interest found within the corresponding field of views. For instance, because more of the region of interest 505 is found in field of view 2, the first sensor may make a greater adjustment to its total gain than the second sensor. The first sensor may adjust its total gain by 4 EV (80% of the total necessary adjustment) and the second sensor may adjust its total gain by 1 EV (20% of the total necessary adjustment). When sensors account for relative region of interest sizes to establish special preferences, the sensors may communicate relevant information to peer sensors. For instance, a sensor may send and receive information including the location of a region of interest, the relative size of a portion of a region of interest located in a field of view for each sensor, any exposure preferences or other user inputs, and current analog gain values, gain values (e.g., total gain), proposed or hypothetical total gain values, and the like.

In some examples, sensors may adjust total gain values based on the region of interest and an exposure bias. In some cases, the region of interest may coincide with lighting conditions corresponding to the exposure bias (e.g., the region of interest 505 may include a high concentration of shadows and the exposure bias may be toward lowlights). In some examples, the region of interest may conflict with lighting conditions corresponding to the exposure bias (e.g., the region of interest 505 may include a high concentration of highlights and the exposure bias may be toward lowlights).

In cases, where the exposure bias and region of interest preferences conflict, the multi-sensor system may resolve the conflict based on one or more arbitration rules. The arbitration rules may be selected as shown in the following table:

$$T'_{target} = \begin{cases} T_{ROI}, & P = \text{NONE} \\ T_{ROI}, & P = \text{HIGHLIGHT and } T_{target} \geq T_{peer\text{-}target} \\ T_{ROI}, & P = \text{SHADOWS and } T_{target} < T_{peer\text{-}target} \\ T_{target}, & \text{otherwise} \end{cases}$$

where

| | Spatial Preference | | | |
|---|---|---|---|---|
| | $Q_{ROI\text{-}self} \geq Q_{ROI\text{-}peer}$ Scene Luminance | | $Q_{ROI\text{-}self} < Q_{ROI\text{-}peer}$ Scene Luminance | |
| Exposure Preference | $T_{target} \geq T_{peer\text{-}target}$ | $T_{target} < T_{peer\text{-}target}$ | $T_{target} \geq T_{peer\text{-}target}$ | $T_{target} < T_{peer\text{-}target}$ |
| NONE | $T_{ROI}$ | $T_{ROI}$ | $T_{ROI}$ | $T_{ROI}$ |
| HIGHLIGHTS | $T_{ROI}$ | $T_{target}$ | $T_{ROI}$ | $T_{target}$ |
| MIDTONES | $T_{target}$ | $T_{target}$ | $T_{target}$ | $T_{target}$ |
| SHADOWS | $T_{target}$ | $T_{ROI}$ | $T_{target}$ | $T_{ROI}$ |

T stands for the total gain to be used by the AEC algorithm, and includes the contribution from the exposure time and the analog gain of the sensor. As such, $T_{target}$ is the targeted total gain of the sensor. $T_{peer\text{-}target}$ represents the targeted total gain of the peer sensor. Q stands for the relative quotient between the size of the region of interest (ROI) among the two sensors (i.e. "self" and "peer"). For example, $Q_{ROI\text{-}self} \geq Q_{ROI\text{-}peer}$ connotes the condition when the region of interest size of the current sensor is larger than or equal to the region of interest size of the peer sensor. $T'_{target}$ is the total gain to be used by the current sensor after the arbitration process. Also, in an illustrative example, if the exposure preference is set to none (e.g., no exposure preference), then the post-arbitration total gain is always based purely on the total gain value as solely determined by the region of interest statistics. In some examples, as described above, peer sensor communication may be used to implement various techniques, as described in greater detail with respect to FIGS. 6 and 7.

Figure 7:
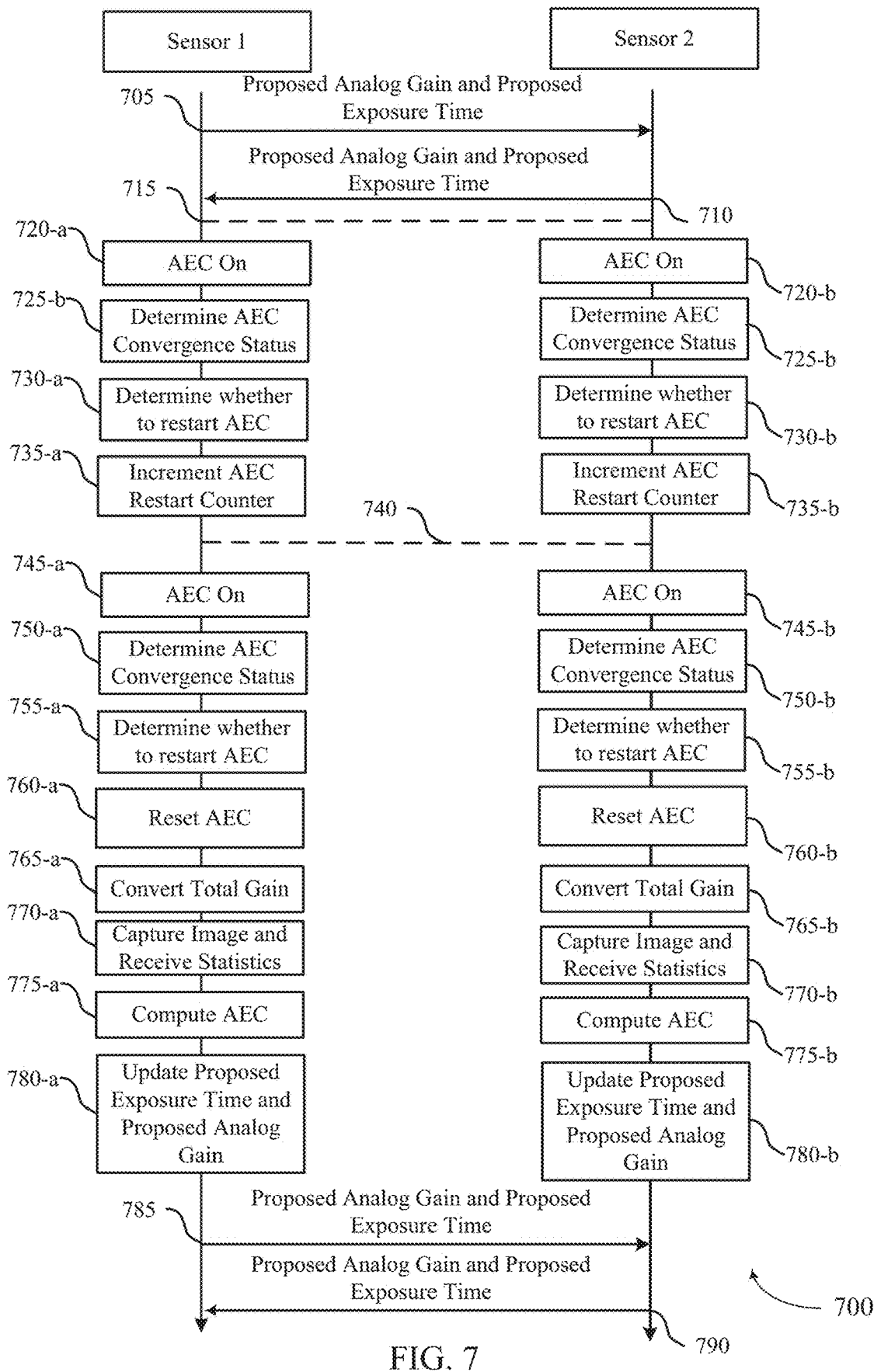
FIG. 7 illustrates an example of a process flow that supports low-power AEC for multi-sensor systems in accordance with aspects of the present disclosure.

FIG. 7 illustrates an example of a process flow 700 that supports low-power AEC for multi-sensor systems in accordance with aspects of the present disclosure. In some examples, a process flow 700 may implement aspects of multi-sensor systems 100, 200, 201, 300, 400, or 500.

In some examples, as described above, a multi-sensor system may perform multi sensor AEC, and peer sensors may communicate to coordinate such techniques. Communication requirements for performing such communications may be described in the following table:

| Sender Variable | Receiver Variable | Bit Width | Range | Unit | Frequency |
|---|---|---|---|---|---|
| Proposed Exposure Time | Peer Exposure Time | 18 bits | 1 . . . 150,000 | microsecond | Per Frame |
| Proposed Analog Gain | Peer Analog Gain | 3 bits | 0 . . . 3 | NA | Per Frame |
| Target Exposure Time | Peer Target Exposure | 18 bits | 1 . . . 150,000 | microsecond- | Per Frame |

| Sender Variable | Receiver Variable | Bit Width | Range | Unit | Frequency |
|---|---|---|---|---|---|
| Target Analog Gain | Time Peer Target Analog Gain | 3 bits | 0 . . . 3 | NA | Per Frame |

In some examples, a first sensors (e.g., sensor 1) and a second sensor (e.g., sensor 2) may communicate and perform multi-sensor AEC as described above. At 605, sensor 1 may determine whether the AEC function is turned on. Upon determining that it AEC functionality is one, sensor 1 may determine an AEC convergence status for a peer sensor (e.g., sensor 2) at 610. For instance, sensor 1 may determine whether an AEC procedure or algorithm has converged on an exposure time at sensor 2 (e.g., may determine whether sensor 2 has sent a message indicating a converged exposure time). Upon determining that sensor 2 has not converged on an exposure time, sensor 1 may apply a bound to a total gain value. The bound may be based on, for example, a maximum exposure time difference, a maximum brightness difference, or the like. Sensor 1 may convert a total gain value to a current exposure time and an analog gain value.

At 620, sensor 1 may capture an image, and may receive image statistics from one or more hardware components of sensor 1. At 625, sensor 1 may compute or re-compute AEC based on the received image statistics. At 630 sensor 1 may update a proposed exposure time and a proposed analog gain value. At 635, sensor 1 may transmit the proposed analog gain and proposed exposure time to sensor 2.

Prior to receiving the proposed analog gain and proposed exposure time at 635, sensor 2 may be sleeping, or may be acting in a single-sensor mode. This may allow sensor 2 to save power by only operating in multi-sensor AEC mode when necessary. At 640-*a* and 640-*b*, sensor 1 and sensor 2 may determine whether an AEC mode is on. At 645-*a* sensor 1 may determine an AEC convergence status for sensor 2, and at 645-*b* sensor 2 may determine an AEC convergence status for sensor 1. Both sensor 1 and sensor 2 may determine that the other sensor is not AEC converged, and may apply a bond to a total gain value at 650-*a* and 650-*b*. For instance, sensor 1 may determine that the field of view captured by sensor 1 is brighter. In some examples sensor 1 may determine that an exposure bias is set to highlights, and may determine that the current total gain (including analog gain and exposure time) is equal to a proposed total gain. Sensor 2 may determine that the field of view captured by sensor 1 is brighter than the field of view captured by sensor 2. In some examples, based on the exposure bias toward highlights, sensor 2 may select the minimum of a proposed total gain and the peer total gain of sensor 1 plus a luminance difference (e.g., an exposure time that satisfies a maximum brightness difference). In some examples, sensor 2 may determine whether its proposed total gain satisfies a maximum brightness difference. If so, sensor 2 may select the proposed total gain for sensor 2 (determined independently from sensor 1). Alternatively, if the proposed total gain for sensor 2 does not satisfy a maximum brightness difference between the proposed total gain for sensor 1, then sensor 2 may select a total gain that is equal to the proposed total gain of sensor 1 plus a luminance difference that is less than or equal to the maximum brightness difference. The proposed total gain of sensor 1 may be known by sensor 2 based on the message received at 635.

At 655-*a* and 655-*b*, sensor 1 and sensor 2 may convert the total gain values to a respective exposure time and an analog gain. At 660-*a* and 660-*b*, sensor 1 and sensor 2 may capture an image using the determined analog gain and exposure time, and may receive image statistics from one or more hardware components at each sensor. At 665-*a* and 665-*b*, sensor 1 and sensor 2 may compute AEC values based on the image statistics that each received from its respective hardware components. At 670-*a*, sensor 1 may update its proposed exposure time and proposed analog gain based on the captured image and the image statistics. At 670-*b*, sensor 2 may similar update its proposed exposure time and proposed analog gain. At 675 sensor 1 may transmit its updated proposed analog gain and proposed exposure time to sensor 2, and at 680, sensor 2 may transmit its updated proposed exposure time and proposed analog gain to sensor 1. Sensor 1 and 2 may continue, discontinue, or restart the multi-sensor AEC procedure, as described in greater detail with respect to FIG. 7.

Figure 8:
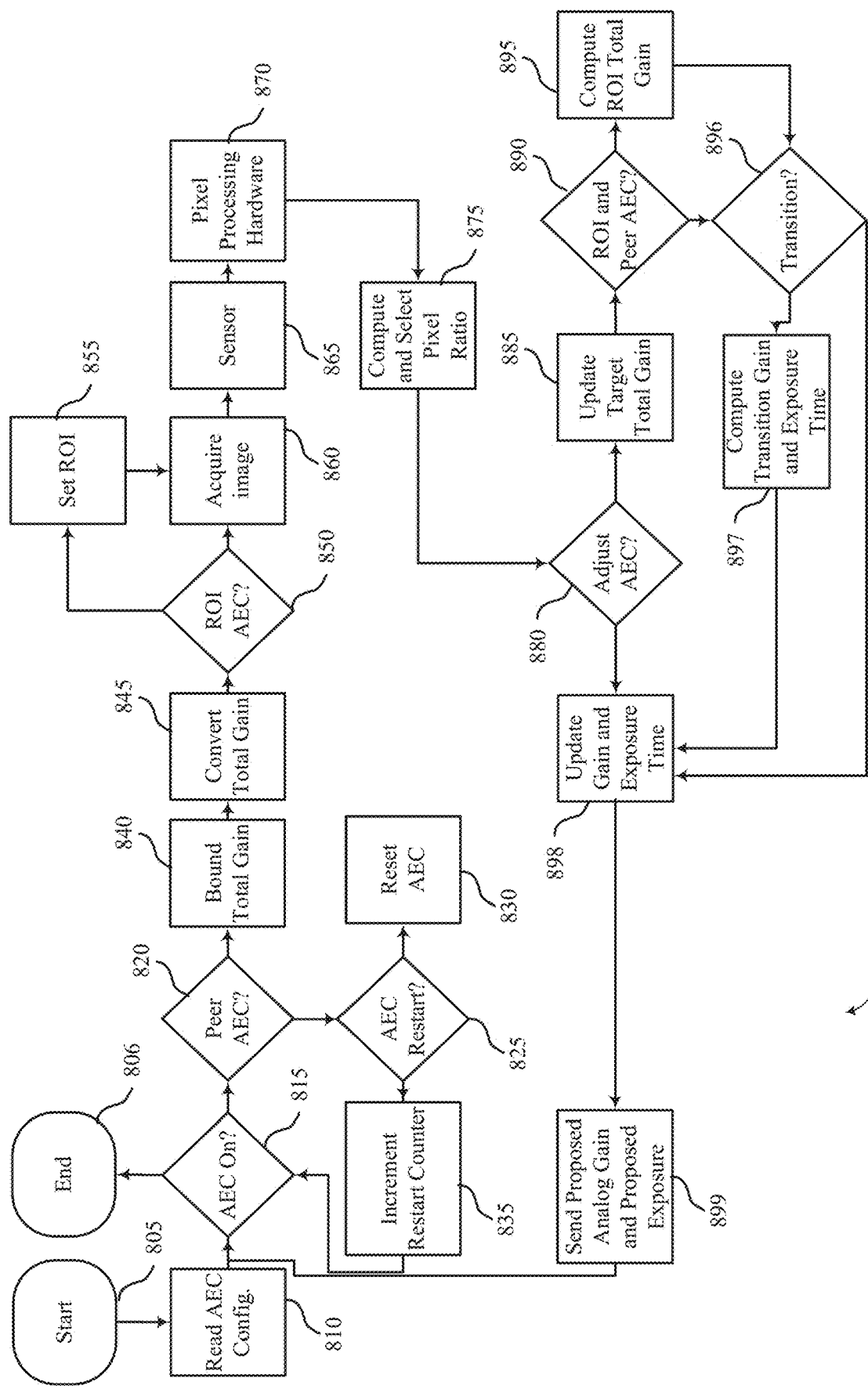
FIG. 8 illustrates an example of a process flow that supports low-power AEC for multi-sensor systems in accordance with aspects of the present disclosure.

FIG. 8 illustrates an example of a process flow 800 that supports low-power AEC for multi-sensor systems in accordance with aspects of the present disclosure. In some examples, process flow 800 implement aspects of multi-sensor systems 100, 200, 201, 300, 400, or 500.

In some examples, multiple sensors in a multi-sensor system (e.g., sensor 1 and sensor 2) may cooperate and communicate to perform multi-sensor AEC. For instance, at 705, 705 may transmit a proposed analog gain and proposed exposure time to sensor 2, and at 710, sensor 2 may transmit a proposed analog gain and proposed exposure time to sensor 1. In some examples, this may occur during a second frame of a communication procedure. That is, the exchange of proposed analog gain and proposed exposure time may occur at the end of a two-frame procedure described with respect to FIG. 6.

During new frame (e.g., a third frame) 715, both sensor 1 and sensor two may determine, at 720-*a* and 720-*b*, whether AEC is turned on at sensor 1 and sensor 2, respectively. At 725-*a* and 725-*b*, sensor 1 and sensor 2 may determine if the other sensor has an converged exposure time. If so, then at 755-*a*, sensor 1 may determine whether to restart the AEC procedure, and at 755-*b* sensor 2 may similarly determine whether to restart the AEC procedure. If both sensors determine not to restart an AEC restart counter. The AEC restart counter may run for a predetermined amount of time, and when the restart counter expires, the AEC procedure may reinitiate.

During new frame (e.g., a fourth frame) 740, sensor 1 and sensor 2 may determine if an AEC mode is turned on at 745-*a* and 745-*b*, and may determine whether a peer sensor has AEC converged at 750-*a* and 750-*b*. At 755-*a* and 755-*b* respectively, sensor 1 and sensor 2 may determine whether to restart an AEC procedure. If the AEC restart counter from 735-*a* and 735-*b* have not expired, then sensor 1 and sensor 2 may determine not to restart the AEC counter, and may instead increment the AEC restart counter, as described at 735-*a* and 735-*b*. However, if the AEC counter has expired, then sensor 1 may determine to restart the AEC procedure and may reset the AEC (and in some cases, reset the AEC restart counter) at 760-*a*. Similarly, sensor 2 may reset the AEC at 760-*b*. At 765-*a* and 765-*b* respectively, sensor 1 and sensor 2 may convert a current total gain value to an exposure time and an analog gain value, and at 770-*a* and 770-*b*, respectively, sensor 1 and sensor 2 may capture an image and receive image statistics (as descried with respect to FIG. 6). At 775-*a* and 775-*b* respectively, sensor 1 and sensor 2 may compute AEC, and at 780-*a* and 780-*b*, sensor 1 and sensor 2 may update their proposed exposure time and proposed analog gain. At 785, sensor 1 may send the updated proposed analog gain and proposed exposure time to sensor 2, and at 790 sensor 2 may send its updated proposed analog gain and proposed exposure time to sensor 1.

Figure 9:
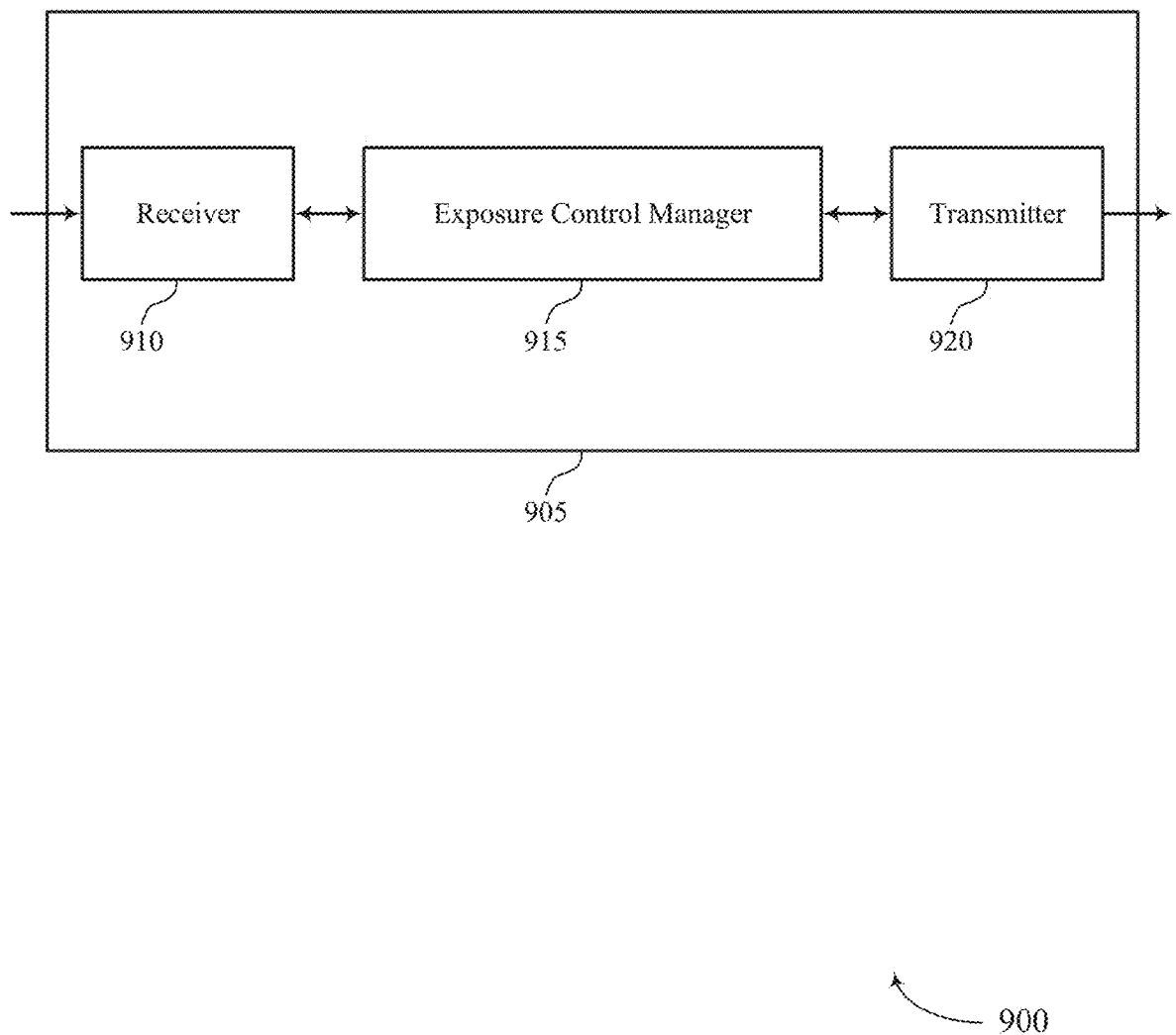
FIG. 9 illustrates an example of a flow chart that supports low-power AEC for multi-sensor systems in accordance with aspects of the present disclosure.

FIG. 9 illustrates an example of a flow chart 900 that supports low-power AEC for multi-sensor systems in accordance with aspects of the present disclosure. In some examples, process flow 900 may implement aspects of multi-sensor systems 100, 200, 201, 300, 400, and 500, or process flows 600 and 700.

In some examples, a multi-sensor AEC procedure may be performed by one or more coordinating and communicating sensors. At 805, the multi-sensor AEC procedure may start. At 810, a sensor may read an AEC configuration including an exposure time and gain. At 815, the sensor may determine if an AEC mode is on. If yes, then at 820 the sensor may determine whether a peer sensor AEC has converged on an exposure time. At 825, the sensor may determine whether to reset or restart an AEC procedure at 830 or increment an AEC restart counter at 835.

After incrementing an AEC restart counter at 835 and the sensor may again determine if an AEC mode is on at 815 (e.g., in a subsequent frame). At 840, the sensor may bound a current total gain, and at 845 the sensor may convert the total gain to a current analog gain and current exposure time. At 850, the sensor may determine whether a region of interest AEC mode is on. If not, then at 860 the sensor may acquire an image without considering a region of interest. If so, then at 855, the sensor may validate or set a region of interest, and the may capture an image at 860. At 865 sensor hardware may capture and generate an image. At 870 pixel processing hardware may generate an image metadata in the form of, for example, five bin pixel counts. At 875, the sensor may compute pixel ratio and select a pixel ratio type, and may generate (e.g., via a processor) a pixel ratio type.

At 880, the sensor may determine whether to adjust an AEC. If the sensor determines not to adjust the AEC, then it may update the proposed AEC Gain and Proposed Exposure time at 898. If the sensor determines to adjust the AEC procedure, then at 885 the sensor may compute an exposure adjustment factor and update a target total gain. At 890, the sensor may determine whether a region of interest or a peer AEC mode is on. If not, then at 896 the sensor may determine whether a transition is needed. If so, then at 895 the sensor may compute a region of interest total gain, and may generate a post region of interest target total gain. At 896 the sensor may determine whether a transition is needed. If not, then the sensor may update the proposed AEC gain and proposed exposure time at 898. If so, then at 897 the sensor may compute and generate a transitional gain and an exposure time, and at 898 the sensor may update the proposed AEC gain and proposed exposure time based thereon, and may generate a new proposed AEC gain and exposure time. At 899 the sensor may send a proposed analog gain and proposed exposure, and may then determine for a subsequent iteration of the algorithm, whether an AEC mode is on at 815. If AEC mode is not on, then the procedure may end at 806.

Figure 10:
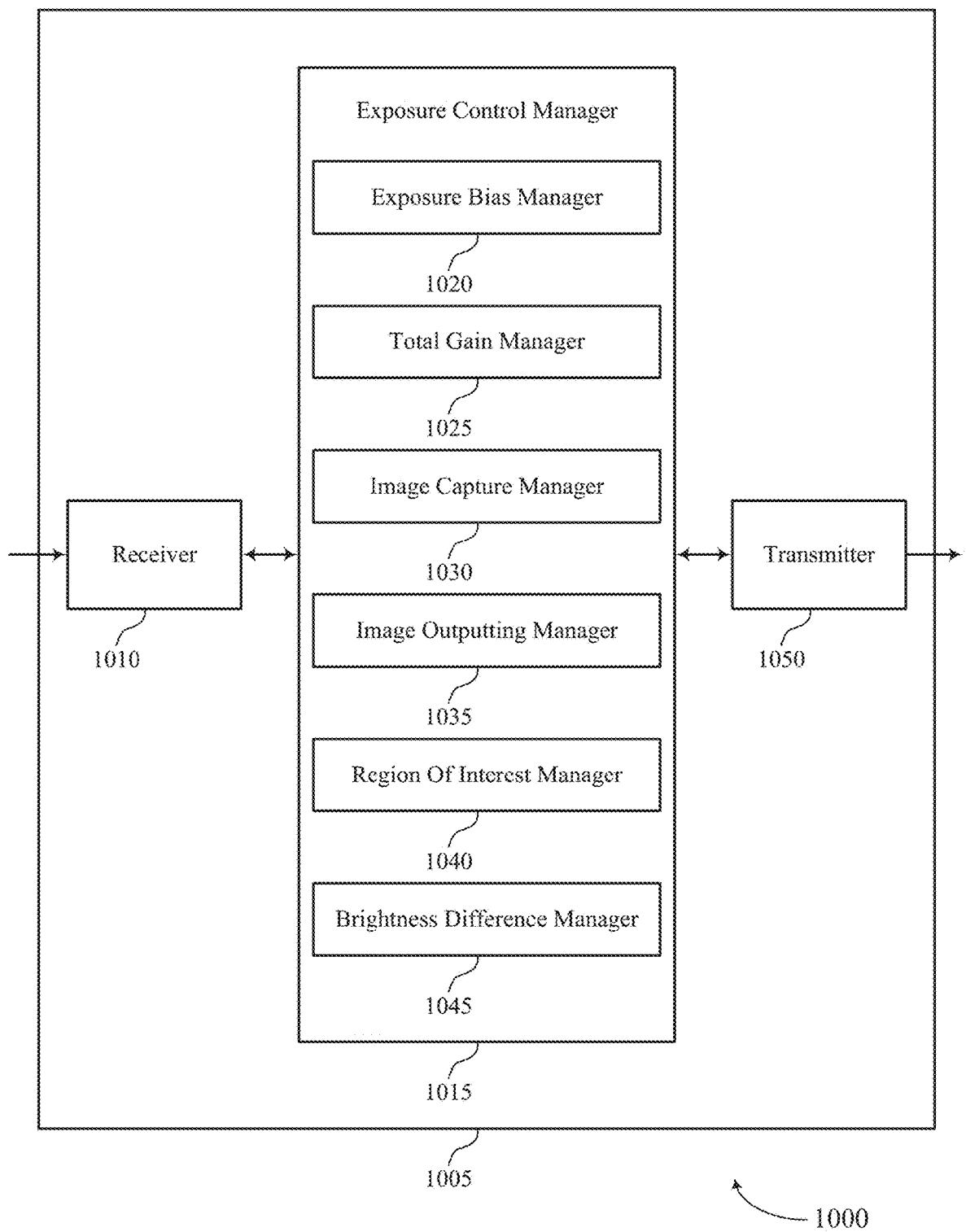
FIGS. 10 and 11 show block diagrams of devices that support low-power AEC for multi-sensor systems in accordance with aspects of the present disclosure.

FIG. 10 shows a block diagram 1000 of a device 1005 that supports low-power AEC for multi-sensor systems in accordance with aspects of the present disclosure. The device 1005 may be an example of a sensor in a multi-sensor system as described herein. The device 1005 may include a receiver 1010, an exposure control manager 1015, and a transmitter 1020. The device 1005 may also include a processor. Each of these components may be in communication with one another (e.g., via one or more buses).

The receiver 1010 may receive information such as sensor data from another sensor (e.g., peer sensor exposure time, peer sensor analog gain, or the like). Information may be passed on to other components of the device 1005. The receiver 1010 may be an example of aspects of a transceiver 1320 described with reference to FIG. 13.

The exposure control manager 1015 may determine an exposure bias for a first sensor having a first field of view and a second sensor having a second field of view, identify a hypothesis total gain for the first sensor based on the exposure bias, identify a peer sensor total gain for the second sensor based on the exposure bias, select a total gain for the first sensor and a total gain for the second sensor based on a difference between the hypothesis total gain and the peer sensor total gain, and based on a maximum brightness difference between the first sensor and the second sensor, capture a first image of the first field of view by the first sensor using the selected total gain for the first sensor and capturing a second image of the second field of view by the second sensor using the selected total gain for the second sensor, and output a third image based on the first image and the second image. The exposure control manager 1015 may also identify a region of interest, where at least a first portion of the region of interest is located in a first field of view associated with a first sensor, determine a target total gain for the first sensor based on the region of interest, and determining a peer target total gain for a second sensor, select a total gain for the first sensor and a total gain for the second sensor based on a comparison between the target total gain and the peer target total gain, capture a first image of the first field of view by the first sensor using the selected total gain for the first sensor and capturing a second image of a second field of view by the second sensor using the selected total gain for the second sensor, and output an image based on the captured first image and the captured second image. The exposure control manager 1015 may also identify a brightness difference between a first sensor having a first field of view and a second sensor having a second field of view, determine an exposure time difference between the first sensor and the second sensor based on the brightness difference, capture, by the first sensor, a first image of the first field of view using a first exposure time, the first exposure time based on the identified brightness difference and the exposure time difference, capture, by the second sensor, a second image of the second field of view using a second exposure time, the second exposure time based on the identified brightness difference and the exposure time difference, and output a third image based on the first image and the second image. The exposure control manager 1015 may be an example of aspects of the exposure control manager 1310 described herein.

The exposure control manager 1015, or its sub-components, may be implemented in hardware, code (e.g., software or firmware) executed by a processor, or any combination thereof. If implemented in code executed by a processor, the functions of the exposure control manager 1015, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The exposure control manager 1015, or its sub-components, may be physically located at various positions, including being distributed such that portions of functions are implemented at different physical locations by one or more physical components. In some examples, the exposure control manager 1015, or its sub-components, may be a separate and distinct component in accordance with various aspects of the present disclosure. In some examples, the exposure control manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit messages generated by other components of the device 1005. For example, transmitter 1020 may send sensor data to another sensor (e.g., peer sensor exposure time, peer sensor analog gain, or the like). In some examples, the transmitter 1020 may be collocated with a receiver 1010 in a transceiver module. For example, the transmitter 1020 may be an example of aspects of the transceiver 1320 described with reference to FIG. 13.

Figure 11:
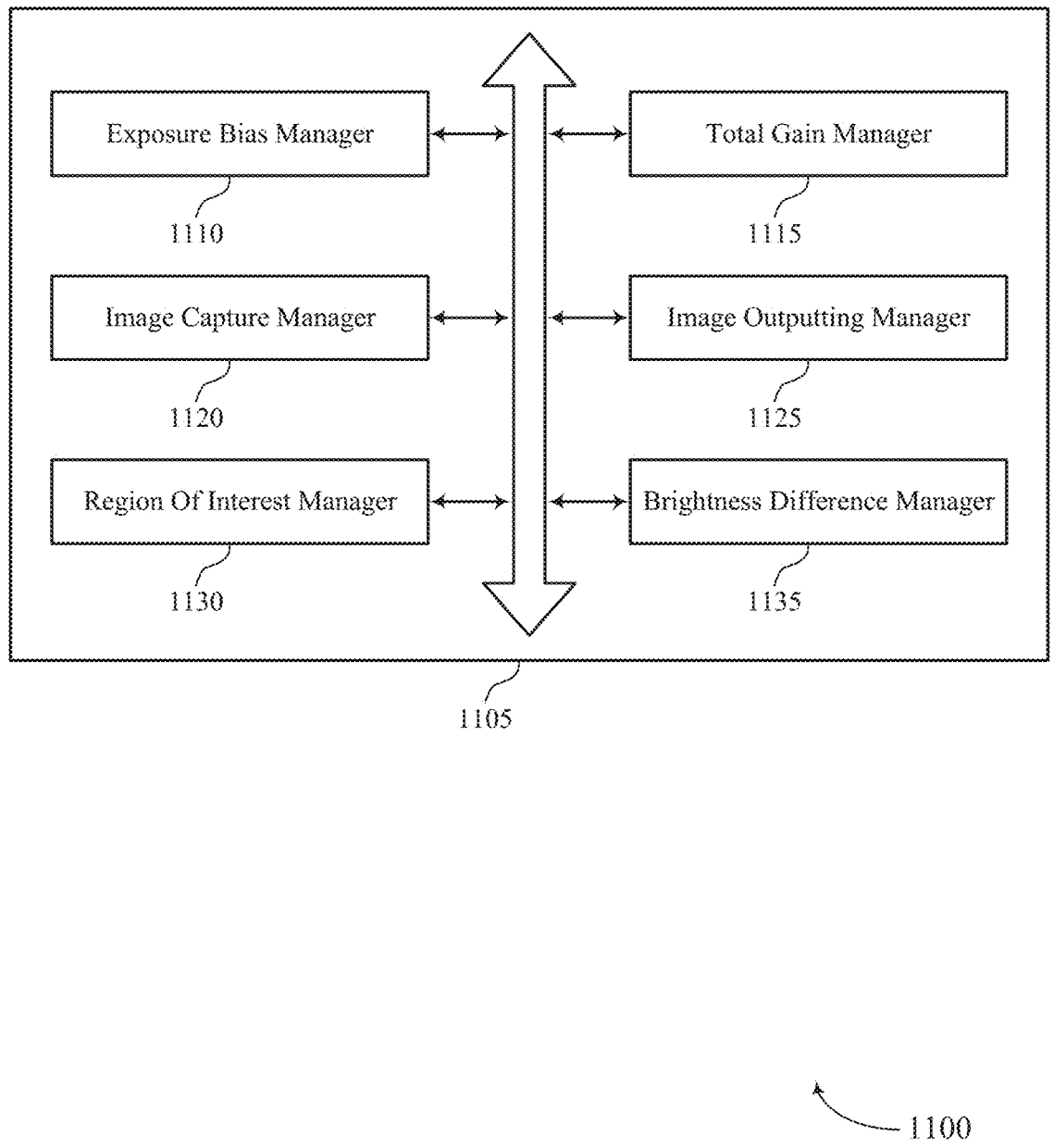

FIG. 11 shows a block diagram 1100 of a device 1105 that supports low-power AEC for multi-sensor systems in accordance with aspects of the present disclosure. The device 1105 may be an example of aspects of a device 1005, or a UE 115 as described herein. The device 1105 may include a receiver 1110, an exposure control manager 1115, and a transmitter 1150. The device 1105 may also include a processor. Each of these components may be in communication with one another (e.g., via one or more buses).

The receiver 1110 may receive information such as sensor data to another sensor (e.g., peer sensor exposure time, peer sensor analog gain, or the like). Information may be passed on to other components of the device 1105. The receiver 1110 may be an example of aspects of the transceiver 1320 described with reference to FIG. 13.

The exposure control manager 1115 may be an example of aspects of the exposure control manager 1015 as described herein. The exposure control manager 1115 may include an exposure bias manager 1120, a total gain manager 1125, an image capture manager 1130, an image outputting manager 1135, a region of interest manager 1140, and a brightness difference manager 1145. The exposure control manager 1115 may be an example of aspects of the exposure control manager 1310 described herein.

The exposure bias manager 1120 may determine an exposure bias for a first sensor having a first field of view and a second sensor having a second field of view. The total gain manager 1125 may identify a hypothesis total gain for the first sensor based on the exposure bias, identify a peer sensor total gain for the second sensor based on the exposure bias, and select a total gain for the first sensor and a total gain for the second sensor based on a difference between the hypothesis total gain and the peer sensor total gain, and based on a maximum brightness difference between the first sensor and the second sensor. The image capture manager 1130 may capture a first image of the first field of view by the first sensor using the selected total gain for the first sensor and capturing a second image of the second field of view by the second sensor using the selected total gain for the second sensor. The image outputting manager 1135 may output a third image based on the first image and the second image. The region of interest manager 1140 may identify a region of interest, where at least a first portion of the region of interest is located in a first field of view associated with a first sensor.

The total gain manager 1125 may determine a target total gain for the first sensor based on the region of interest, and determining a peer target total gain for a second sensor and select a total gain for the first sensor and a total gain for the second sensor based on a comparison between the target total gain and the peer target total gain.

The image capture manager 1130 may capture a first image of the first field of view by the first sensor using the selected total gain for the first sensor and capturing a second image of a second field of view by the second sensor using the selected total gain for the second sensor.

The image outputting manager 1135 may output an image based on the captured first image and the captured second image.

The brightness difference manager 1145 may identify a brightness difference between a first sensor having a first field of view and a second sensor having a second field of view.

The exposure bias manager 1120 may determine an exposure time difference between the first sensor and the second sensor based on the brightness difference.

The image capture manager 1130 may capture, by the first sensor, a first image of the first field of view using a first exposure time, the first exposure time based on the identified brightness difference and the exposure time difference and capture, by the second sensor, a second image of the second field of view using a second exposure time, the second exposure time based on the identified brightness difference and the exposure time difference.

The image outputting manager 1135 may output a third image based on the first image and the second image.

The transmitter 1150 may transmit messages generated by other components of the device 1105. In some examples, the transmitter 1150 may be collocated with a receiver 1110 in a transceiver module. For example, the transmitter 1150 may be an example of aspects of the transceiver 1320 described with reference to FIG. 13.

Figure 12:
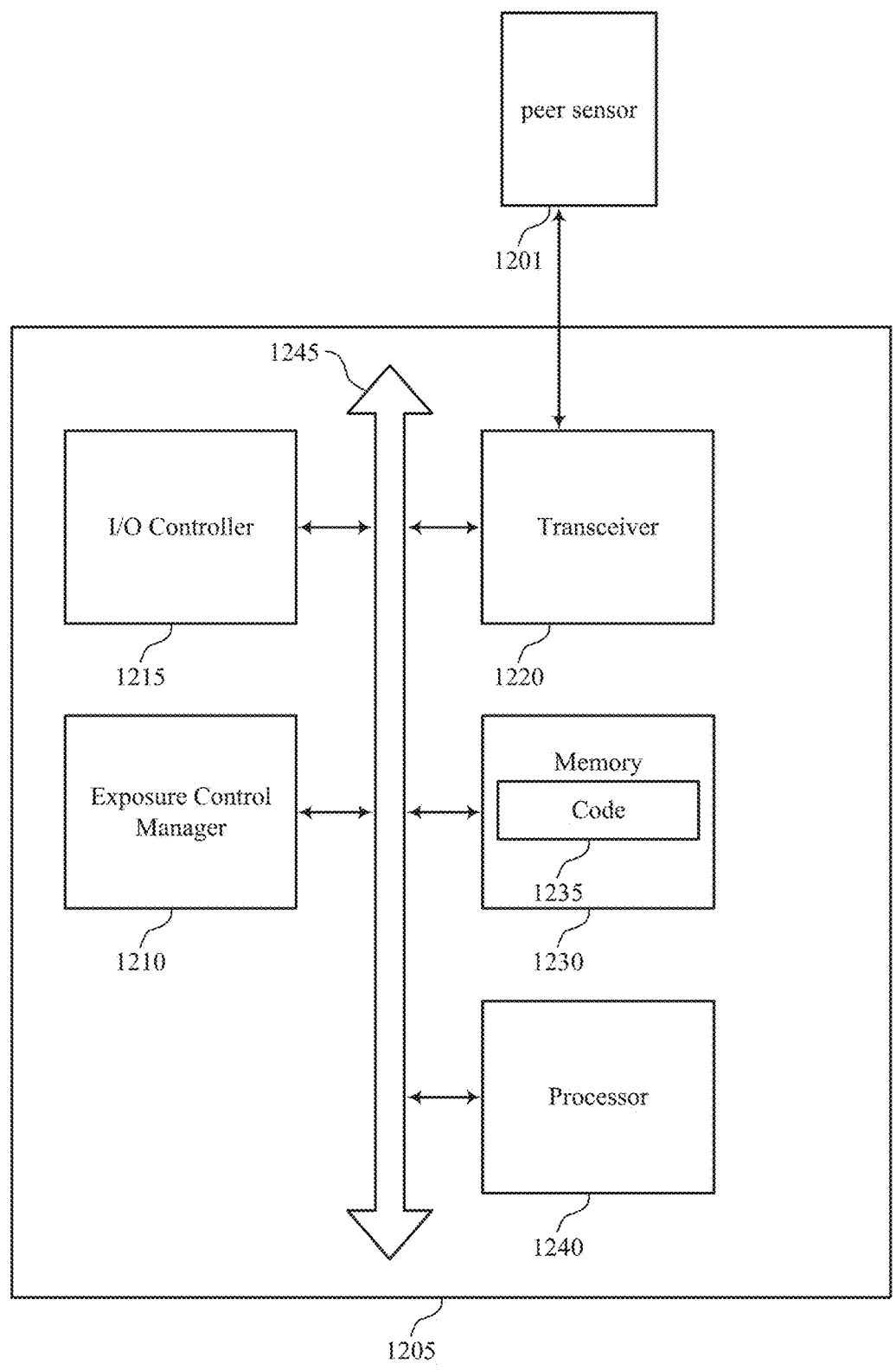
FIG. 12 shows a block diagram of a exposure control manager that supports low-power AEC for multi-sensor systems in accordance with aspects of the present disclosure.

FIG. 12 shows a block diagram 1200 of a exposure control manager 1205 that supports low-power AEC for multi-sensor systems in accordance with aspects of the present disclosure. The exposure control manager 1205 may be an example of aspects of a exposure control manager 1015, a exposure control manager 1115, or a exposure control manager 1310 described herein. The exposure control manager 1205 may include an exposure bias manager 1210, a total gain manager 1215, an image capture manager 1220, an image outputting manager 1225, a region of interest manager 1230, and a brightness difference manager 1235. Each of these modules may communicate, directly or indirectly, with one another (e.g., via one or more buses).

The exposure bias manager 1210 may determine an exposure bias for a first sensor having a first field of view and a second sensor having a second field of view. In some examples, the exposure bias manager 1210 may determine an exposure time difference between the first sensor and the second sensor based on the brightness difference. In some examples, the exposure bias manager 1210 may receive a user input identifying the exposure bias, or automatically selecting an exposure bias based on one or more conditions. In some examples, the exposure bias manager 1210 may identify an exposure bias for the first sensor and an exposure bias for the second sensor. In some cases, the exposure bias includes a bias toward a highlights of a dynamic range, a bias toward shadows of the dynamic range, a bias toward midtones of the dynamic range, or no bias.

The total gain manager 1215 may identify a hypothesis total gain for the first sensor based on the exposure bias. In some examples, the total gain manager 1215 may identify a peer sensor total gain for the second sensor based on the exposure bias.

In some examples, the total gain manager 1215 may select a total gain for the first sensor and a total gain for the second sensor based on a difference between the hypothesis total gain and the peer sensor total gain, and based on a maximum brightness difference between the first sensor and the second sensor. In some examples, the total gain manager 1215 may determine a target total gain for the first sensor based on the region of interest, and determining a peer target total gain for a second sensor. In some examples, the total gain manager 1215 may select a total gain for the first sensor and a total gain for the second sensor based on a comparison between the target total gain and the peer target total gain. In some examples, the total gain manager 1215 may identify that the hypothesis total gain is closer to the exposure bias than the peer sensor total gain.

In some examples, the total gain manager 1215 may identify a maximum difference between the total gain of the first sensor and the total gain of the second sensor based on the maximum brightness difference between the first sensor and the second sensor. In some examples, the total gain manager 1215 may determine that the maximum difference between the total gain of the first sensor and the total gain of the second sensor is greater than the difference between the hypothesis total gain and the peer sensor total gain. In some examples, where selecting the total gain for the first sensor and the total gain for the second sensor further includes setting the total gain for the first sensor equal to the hypothesis total gain, and setting the total gain for the second sensor equal to the peer sensor total gain based on the determining.

In some examples, the total gain manager 1215 may determine that the maximum difference between the total gain of the first sensor and the total gain of the second sensor is less than the difference between the hypothesis total gain and the peer sensor total gain.

In some examples, selecting the total gain for the first sensor and the total gain for the second sensor further includes setting the total gain for the first sensor equal to the hypothesis total gain, and setting the total gain for the second sensor such that the difference between the total gain for the first sensor and the total gain for the second sensor is equal to the maximum difference between the total gain of the first sensor and the total gain of the second sensor.

In some examples, the total gain manager 1215 may identify that the peer sensor total gain is closer to the exposure bias than the hypothesis total gain. In some examples, selecting the total gain for the first sensor and the total gain for the second sensor further includes setting the total gain for the first sensor such that the difference between the total gain for the first sensor and the total gain for the second sensor is equal to the maximum difference between the total gain of the first sensor and the total gain of the second sensor, and setting the total gain for the second sensor equal to the peer sensor total gain.

In some examples, the total gain manager 1215 may send, from the first sensor to the second sensor, the hypothesis total gain. In some examples, the total gain manager 1215 may receive, from the second sensor at the first sensor, the peer sensor total gain, where identifying the peer sensor total gain for the second sensor is based on receiving. In some examples, the total gain manager 1215 may where selecting a total gain for the first sensor and a total gain for the second sensor is based on the sending and the receiving.

In some examples, the total gain manager 1215 may select the target total gain for the first sensor and the peer target total gain for the second sensor based on a determined relative sizes. In some examples, the total gain manager 1215 may select the total gain for the first sensor and the total gain for the second sensor based on the maximum brightness difference. In some examples, the total gain manager 1215 may select the total gain for the first sensor and the total gain for the second sensor based on the identified exposure bias for the first sensor and the identified exposure bias for the second sensor.

In some examples, the total gain manager 1215 may send, from the first sensor to the second sensor, the target total gain. In some examples, the total gain manager 1215 may receive, from the second sensor at the first sensor, the peer target total gain, where determining a peer target total gain for a second sensor is based on the receiving. In some examples, the total gain manager 1215 may where selecting a total gain for the first sensor and a total gain for the second sensor is based on the sending and the receiving. In some examples, the total gain manager 1215 may where determining an exposure time difference between the first sensor and the second sensor is based on the determined maximum brightness difference.

In some examples, the total gain manager 1215 may identify a motion blur coherence between the first sensor and the second sensor. In some examples, the total gain manager 1215 may determine a maximum exposure time difference between the first sensor and the second sensor based on the determined motion blur coherence. In some examples, the total gain manager 1215 may where determining an exposure time difference between the first sensor and the second sensor is based on the maximum exposure time difference. In some examples, the total gain manager 1215 may where identifying the exposure time difference between the first sensor and the second sensor is based on the first proposed exposure time and the second proposed exposure time. In some cases, a total gain value is based on analog gain, digital gain, exposure time, or a combination thereof.

The image capture manager 1220 may capture a first image of the first field of view by the first sensor using the selected total gain for the first sensor and capturing a second image of the second field of view by the second sensor using the selected total gain for the second sensor. In some examples, the image capture manager 1220 may capture a first image of the first field of view by the first sensor using the selected total gain for the first sensor and capturing a second image of a second field of view by the second sensor using the selected total gain for the second sensor. In some examples, the image capture manager 1220 may capture, by the first sensor, a first image of the first field of view using a first exposure time, the first exposure time based on the identified brightness difference and the exposure time difference. In some examples, the image capture manager 1220 may capture, by the second sensor, a second image of the second field of view using a second exposure time, the second exposure time based on the identified brightness difference and the exposure time difference.

The image outputting manager 1225 may output a third image based on the first image and the second image. In some examples, the image outputting manager 1225 may output an image based on the captured first image and the captured second image. In some examples, the image outputting manager 1225 may output a third image based on the first image and the second image. In some cases, the third image includes an entirety of the first image and the second image.

The region of interest manager 1230 may identify a region of interest, where at least a first portion of the region of interest is located in a first field of view associated with a first sensor. In some examples, the region of interest manager 1230 may determine a relative size of the first portion of the region of interest that is located in the first field of view and determining a relative size of the second portion of the region of interest that is located in the second field of view. In some cases, at least a second portion of the region of interest is located in the second field of view; and where identifying the region of interest further includes.

The brightness difference manager 1235 may identify a brightness difference between a first sensor having a first field of view and a second sensor having a second field of view. In some examples, the brightness difference manager 1235 may identify a maximum brightness difference between the first sensor and the second sensor. In some examples, the brightness difference manager 1235 may identify an exposure coherence between the first sensor and the second sensor. In some examples, the brightness difference manager 1235 may determine a maximum brightness difference between the first sensor and the second sensor based on the determined exposure coherence.

In some examples, the brightness difference manager 1235 may determine whether a dynamic range of a scene covered by the first field of view and the second field of view exceeds the dynamic range of the first sensor and the second sensor, where identifying the brightness difference between the first sensor and the second sensor and the exposure time difference between the first sensor and the second sensor are based on the determining. In some examples, the brightness difference manager 1235 may send, from the first sensor to the second sensor, a current brightness value of the first field of view and a first proposed exposure time. In some examples, the brightness difference manager 1235 may receive, from the second sensor at the first sensor, a current brightness value of the second field of view and a second proposed exposure time. In some examples, the brightness difference manager 1235 may where identifying the brightness difference between the first sensor and the second sensor is based on the current brightness value of the first field of view and the current brightness value of the second field of view.

Figure 13:
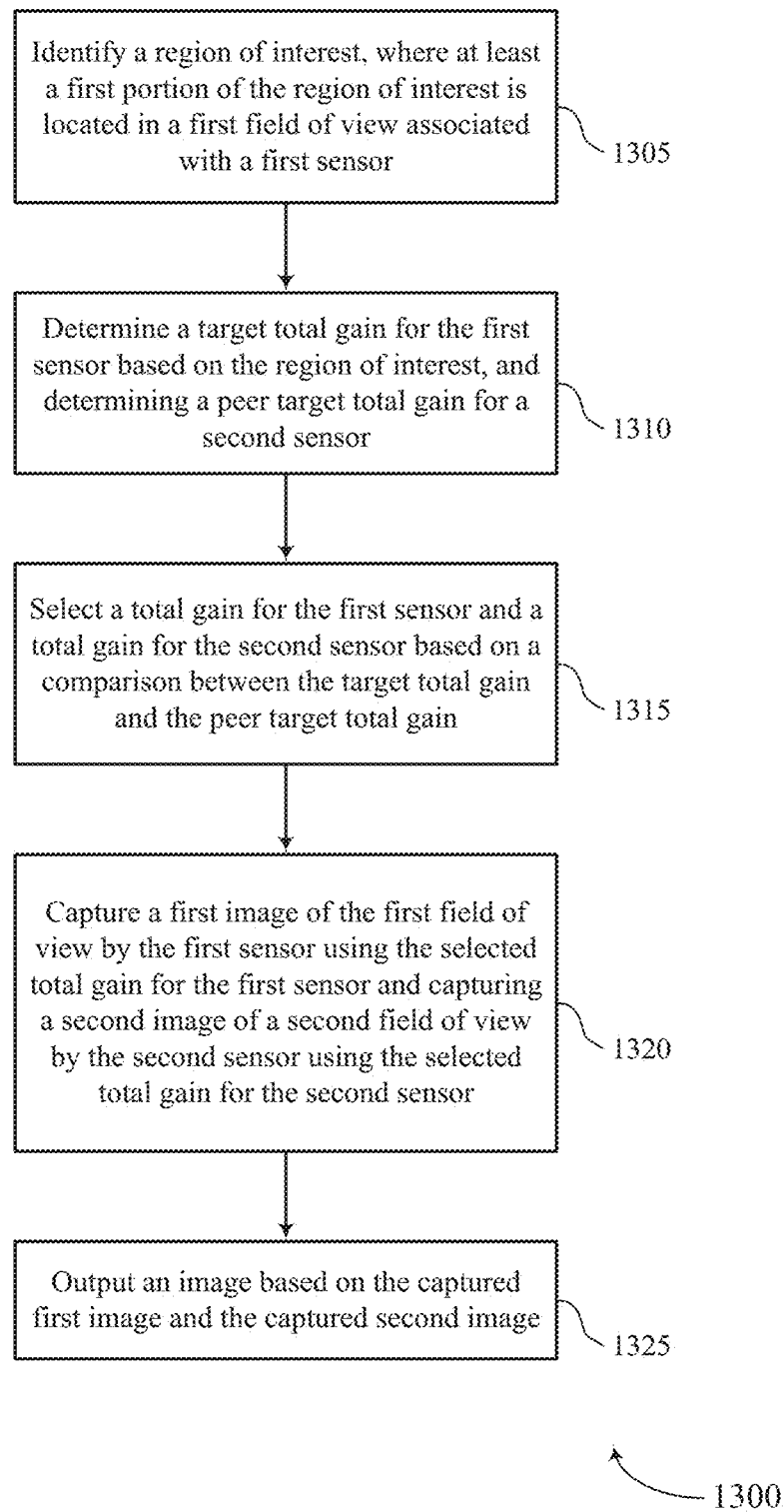
FIGS. 13 and 14 shows a diagram of a system including a device that supports low-power AEC for multi-sensor systems in accordance with aspects of the present disclosure.

FIG. 13 shows a diagram of a system 1300 including a device 1305 that supports low-power AEC for multi-sensor systems in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including an exposure control manager 1310, an I/O controller 1315, a transceiver 1320, memory 1330, and a processor 1340. These components may be in electronic communication via one or more buses (e.g., bus 1345).

The exposure control manager 1310 may determine an exposure bias for a first sensor having a first field of view and a second sensor having a second field of view, identify a hypothesis total gain for the first sensor based on the exposure bias, identify a peer sensor total gain for the second sensor based on the exposure bias, select a total gain for the first sensor and a total gain for the second sensor based on a difference between the hypothesis total gain and the peer sensor total gain, and based on a maximum brightness difference between the first sensor and the second sensor, capture a first image of the first field of view by the first sensor using the selected total gain for the first sensor and capturing a second image of the second field of view by the second sensor using the selected total gain for the second sensor, and output a third image based on the first image and the second image. The exposure control manager 1310 may also identify a region of interest, where at least a first portion of the region of interest is located in a first field of view associated with a first sensor, determine a target total gain for the first sensor based on the region of interest, and determining a peer target total gain for a second sensor, select a total gain for the first sensor and a total gain for the second sensor based on a comparison between the target total gain and the peer target total gain, capture a first image of the first field of view by the first sensor using the selected total gain for the first sensor and capturing a second image of a second field of view by the second sensor using the selected total gain for the second sensor, and output an image based on the captured first image and the captured second image. The exposure control manager 1310 may also identify a brightness difference between a first sensor having a first field of view and a second sensor having a second field of view, determine an exposure time difference between the first sensor and the second sensor based on the brightness difference, capture, by the first sensor, a first image of the first field of view using a first exposure time, the first exposure time based on the identified brightness difference and the exposure time difference, capture, by the second sensor, a second image of the second field of view using a second exposure time, the second exposure time based on the identified brightness difference and the exposure time difference, and output a third image based on the first image and the second image.

The I/O controller 1315 may manage input and output messages for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may include hardwiring to communicate sensor data with a peer sensor 1201, or with a multi-sensor system manager. Transceiver 1320 may be in communication with other components of device 1205.

The memory 1330 may include a random-access memory (RAM), read-only memory (ROM). The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting low-power AEC for multi-sensor systems).

The code 1335 may include instructions to implement aspects of the present disclosure, including instructions to support exposure control. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
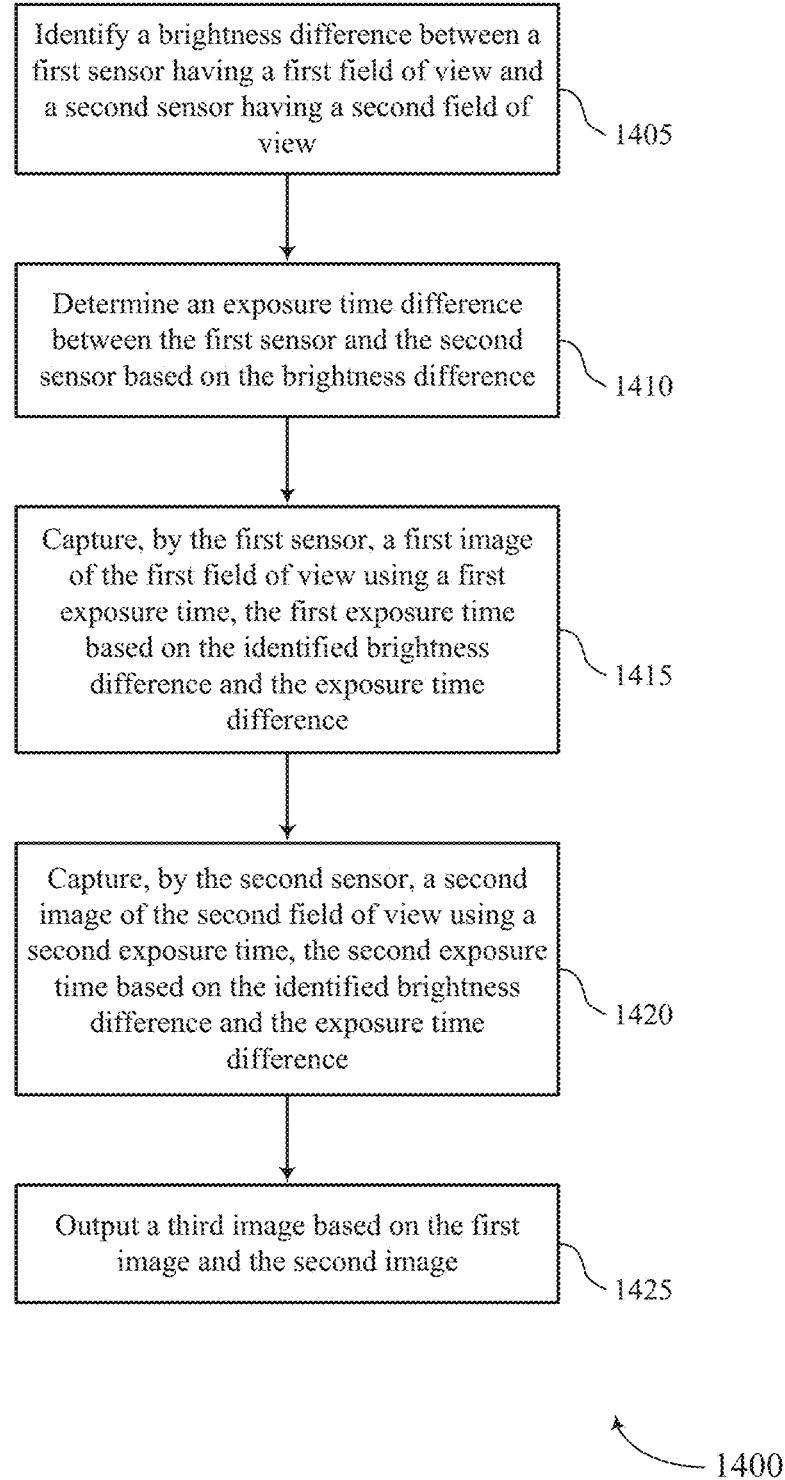

FIG. 14 shows a flowchart illustrating a method 1400 that supports low-power AEC for multi-sensor systems in accordance with aspects of the present disclosure. The operations of method 1400 may be implemented by a UE 115 or its components as described herein. For example, the operations of method 1400 may be performed by a exposure control manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1405, the UE may identify a region of interest, where at least a first portion of the region of interest is located in a first field of view associated with a first sensor. The operations of 1405 may be performed according to the methods described herein. In some examples, aspects of the operations of 1405 may be performed by a region of interest manager as described with reference to FIGS. 10 through 13.

At 1410, the UE may determine a target total gain for the first sensor based on the region of interest, and determining a peer target total gain for a second sensor. The operations of 1410 may be performed according to the methods described herein. In some examples, aspects of the operations of 1410 may be performed by a total gain manager as described with reference to FIGS. 10 through 13.

At 1415, the UE may select a total gain for the first sensor and a total gain for the second sensor based on a comparison between the target total gain and the peer target total gain. The operations of 1415 may be performed according to the methods described herein. In some examples, aspects of the operations of 1415 may be performed by a total gain manager as described with reference to FIGS. 10 through 13.

At 1420, the UE may capture a first image of the first field of view by the first sensor using the selected total gain for the first sensor and capturing a second image of a second field of view by the second sensor using the selected total gain for the second sensor. The operations of 1420 may be performed according to the methods described herein. In some examples, aspects of the operations of 1420 may be performed by an image capture manager as described with reference to FIGS. 10 through 13.

At 1425, the UE may output an image based on the captured first image and the captured second image. The operations of 1425 may be performed according to the methods described herein. In some examples, aspects of the operations of 1425 may be performed by an image outputting manager as described with reference to FIGS. 10 through 13.

FIG. 15 shows a flowchart illustrating a method 1500 that supports low-power AEC for multi-sensor systems in accordance with aspects of the present disclosure. The operations of method 1500 may be implemented by a UE 115 or its components as described herein. For example, the operations of method 1500 may be performed by a exposure control manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1505, the UE may identify a brightness difference between a first sensor having a first field of view and a second sensor having a second field of view. The operations of 1505 may be performed according to the methods described herein. In some examples, aspects of the operations of 1505 may be performed by a brightness difference manager as described with reference to FIGS. 10 through 13.

At 1510, the UE may determine an exposure time difference between the first sensor and the second sensor based on the brightness difference. The operations of 1510 may be performed according to the methods described herein. In some examples, aspects of the operations of 1510 may be performed by an exposure bias manager as described with reference to FIGS. 10 through 13.

At 1515, the UE may capture, by the first sensor, a first image of the first field of view using a first exposure time, the first exposure time based on the identified brightness difference and the exposure time difference. The operations of 1515 may be performed according to the methods described herein. In some examples, aspects of the operations of 1515 may be performed by an image capture manager as described with reference to FIGS. 10 through 13.

At 1520, the UE may capture, by the second sensor, a second image of the second field of view using a second exposure time, the second exposure time based on the identified brightness difference and the exposure time difference. The operations of 1520 may be performed according to the methods described herein. In some examples, aspects of the operations of 1520 may be performed by an image capture manager as described with reference to FIGS. 10 through 13.

At 1525, the UE may output a third image based on the first image and the second image. The operations of 1525 may be performed according to the methods described herein. In some examples, aspects of the operations of 1525 may be performed by an image outputting manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various multi-sensor systems (e.g., a security system, an automation system, a surveillance system, or other multi-sensor systems). The systems described herein may support wired communication between sensors, wired communication between sensors and a sensor manager, wireless communication between sensors and devices of the system, or a combination thereof. Information and messages described herein may be represented using any of a variety of different technologies and techniques. For example, data, instructions, commands, information, messages, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, sensor, communication or sensor manager, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for exposure control, comprising:
    determining an exposure bias for a first sensor having a first field of view and a second sensor having a second field of view;
    identifying a hypothesis total gain for the first sensor based at least in part on the exposure bias;
    identifying a peer sensor total gain for the second sensor based at least in part on the exposure bias;
    selecting a total gain for the first sensor and a total gain for the second sensor based at least in part on a difference between the hypothesis total gain and the peer sensor total gain, and based at least in part on a maximum brightness difference between the first sensor and the second sensor;
    capturing a first image of the first field of view by the first sensor using the selected total gain for the first sensor and capturing a second image of the second field of view by the second sensor using the selected total gain for the second sensor; and
    outputting a third image based at least in part on the first image and the second image.

2. The method of claim 1, further comprising:
    identifying that the hypothesis total gain is closer to the exposure bias than the peer sensor total gain;
    identifying a maximum difference between the total gain of the first sensor and the total gain of the second sensor based at least in part on the maximum brightness difference between the first sensor and the second sensor;
    determining that the maximum difference between the total gain of the first sensor and the total gain of the second sensor is greater than the difference between the hypothesis total gain and the peer sensor total gain; and wherein selecting the total gain for the first sensor and the total gain for the second sensor further comprises setting the total gain for the first sensor equal to the hypothesis total gain, and setting the total gain for the second sensor equal to the peer sensor total gain based at least in part on the determining that the maximum difference between the total gain of the first sensor and the total gain of the second sensor is greater than the difference between the hypothesis total gain and the peer sensor total gain.

3. The method of claim 1, further comprising:

identifying that the hypothesis total gain is closer to the exposure bias than the peer sensor total gain;

identifying a maximum difference between the total gain of the first sensor and the total gain of the second sensor based at least in part on the maximum brightness difference between the first sensor and the second sensor;

determining that the maximum difference between the total gain of the first sensor and the total gain of the second sensor is less than the difference between the hypothesis total gain and the peer sensor total gain; and wherein selecting the total gain for the first sensor and the total gain for the second sensor further comprises setting the total gain for the first sensor equal to the hypothesis total gain, and setting the total gain for the second sensor such that the difference between the total gain for the first sensor and the total gain for the second sensor is equal to the maximum difference between the total gain of the first sensor and the total gain of the second sensor.

4. The method of claim 1, further comprising:

identifying that the peer sensor total gain is closer to the exposure bias than the hypothesis total gain;

identifying a maximum difference between the total gain of the first sensor and the total gain of the second sensor based at least in part on the maximum brightness difference between the first sensor and the second sensor;

determining that the maximum difference between the total gain of the first sensor and the total gain of the second sensor is greater than the difference between the hypothesis total gain and the peer sensor total gain; and wherein selecting the total gain for the first sensor and the total gain for the second sensor further comprises setting the total gain for the first sensor equal to the hypothesis total gain, and setting the total gain for the second sensor equal to the peer sensor total gain based at least in part on the determining that the maximum difference between the total gain of the first sensor and the total gain of the second sensor is greater than the difference between the hypothesis total gain and the peer sensor total gain.

5. The method of claim 1, further comprising:

identifying that the peer sensor total gain is closer to the exposure bias than the hypothesis total gain;

identifying a maximum difference between the total gain of the first sensor and the total gain of the second sensor based at least in part on the maximum brightness difference between the first sensor and the second sensor;

determining that the maximum difference between the total gain of the first sensor and the total gain of the second sensor is less than the difference between the hypothesis total gain and the peer sensor total gain; and wherein selecting the total gain for the first sensor and the total gain for the second sensor further comprises setting the total gain for the first sensor such that the difference between the total gain for the first sensor and the total gain for the second sensor is equal to the maximum difference between the total gain of the first sensor and the total gain of the second sensor, and setting the total gain for the second sensor equal to the peer sensor total gain.

6. The method of claim 1, wherein determining the exposure bias further comprises:

receiving a user input identifying the exposure bias, or automatically selecting an exposure bias based on one or more conditions.

7. The method of claim 1, wherein the exposure bias comprises a bias toward a highlights of a dynamic range, a bias toward shadows of the dynamic range, a bias toward midtones of the dynamic range, or no bias.

8. The method of claim 1, further comprising:

sending, from the first sensor to the second sensor, the hypothesis total gain;

receiving, from the second sensor at the first sensor, the peer sensor total gain, wherein identifying the peer sensor total gain for the second sensor is based at least in part on receiving; and wherein selecting a total gain for the first sensor and a total gain for the second sensor is based at least in part on the sending and the receiving.

9. The method of claim 1, wherein a total gain value is based at least in part on analog gain, digital gain, exposure time, or a combination thereof.

10. A method for exposure control, comprising:

identifying a region of interest, wherein at least a first portion of the region of interest is located in a first field of view associated with a first sensor;

determining a target total gain for the first sensor based at least in part on the region of interest, and determining a peer target total gain for a second sensor;

selecting a total gain for the first sensor and a total gain for the second sensor based at least in part on a comparison between the target total gain and the peer target total gain;

capturing a first image of the first field of view by the first sensor using the selected total gain for the first sensor and capturing a second image of a second field of view by the second sensor using the selected total gain for the second sensor; and outputting an image based at least in part on the captured first image and the captured second image.

11. The method of claim 10, wherein:

at least a second portion of the region of interest is located in the second field of view; and wherein identifying the region of interest further comprises determining a relative size of the first portion of the region of interest that is located in the first field of view and determining a relative size of the second portion of the region of interest that is located in the second field of view; and selecting the target total gain for the first sensor and the peer target total gain for the second sensor based at least in part on a determined relative sizes.

12. The method of claim 10, further comprising:

identifying a maximum brightness difference between the first sensor and the second sensor; and selecting the total gain for the first sensor and the total gain for the second sensor based at least in part on the maximum brightness difference.

13. The method of claim 10, further comprising:
identifying an exposure bias for the first sensor and an exposure bias for the second sensor; and
selecting the total gain for the first sensor and the total gain for the second sensor based at least in part on the identified exposure bias for the first sensor and the identified exposure bias for the second sensor.

14. The method of claim 10, further comprising:
sending, from the first sensor to the second sensor, the target total gain;
receiving, from the second sensor at the first sensor, the peer target total gain, wherein determining a peer target total gain for a second sensor is based at least in part on the receiving; and
wherein selecting a total gain for the first sensor and a total gain for the second sensor is based at least in part on the sending and the receiving.

15. A method for exposure control, comprising:
identifying a brightness difference between a first sensor having a first field of view and a second sensor having a second field of view;
determining, based at least in part on a maximum brightness difference between the first sensor and the second sensor, an exposure time difference between the first sensor and the second sensor based at least in part on the brightness difference;
capturing, by the first sensor, a first image of the first field of view using a first exposure time, the first exposure time based at least in part on the identified brightness difference and the exposure time difference;
capturing, by the second sensor, a second image of the second field of view using a second exposure time, the second exposure time based at least in part on the identified brightness difference and the exposure time difference; and
outputting a third image based at least in part on the first image and the second image.

16. The method of claim 15, further comprising:
identifying an exposure coherence between the first sensor and the second sensor;
determining a maximum brightness difference between the first sensor and the second sensor based at least in part on the determined exposure coherence; and
wherein determining an exposure time difference between the first sensor and the second sensor is based at least in part on the determined maximum brightness difference.

17. The method of claim 15, further comprising:
identifying a motion blur coherence between the first sensor and the second sensor; and
determining the maximum exposure time difference between the first sensor and the second sensor based at least in part on the determined motion blur coherence.

18. The method of claim 15, further comprising:
determining whether a dynamic range of a scene covered by the first field of view and the second field of view exceeds the dynamic range of the first sensor and the second sensor, wherein identifying the brightness difference between the first sensor and the second sensor and the exposure time difference between the first sensor and the second sensor are based at least in part on the determining whether the dynamic range of the scene covered by the first field of view and the second field of view exceeds the dynamic range of the first sensor and the second sensor.

19. The method of claim 15, wherein the third image comprises an entirety of the first image and the second image.

20. The method of claim 15, further comprising:
sending, from the first sensor to the second sensor, a current brightness value of the first field of view and a first proposed exposure time;
receiving, from the second sensor at the first sensor, a current brightness value of the second field of view and a second proposed exposure time;
wherein identifying the brightness difference between the first sensor and the second sensor is based at least in part on the current brightness value of the first field of view and the current brightness value of the second field of view; and
wherein identifying the exposure time difference between the first sensor and the second sensor is based at least in part on the first proposed exposure time and the second proposed exposure time.

* * * * *